US006095867A

United States Patent [19]

Brandt et al.

[11] Patent Number: 6,095,867

[45] Date of Patent: Aug. 1, 2000

[54] METHOD AND APPARATUS FOR TRANSMITTING POWER AND DATA SIGNALS VIA A NETWORK CONNECTOR SYSTEM INCLUDING INTEGRAL POWER CAPACITORS

[75] Inventors: David D. Brandt, Milwaukee, Wis.; Robert E. Lounsbury, Chardon, Ohio

[73] Assignee: Rockwell Technologies, LLC, Thousand Oaks, Calif.

[21] Appl. No.: 09/158,185

[22] Filed: Sep. 21, 1998

[51] Int. Cl.[7] .................................................. A01R 13/66

[52] U.S. Cl. .......................................... 439/620; 439/502

[58] Field of Search .................................... 439/620, 189, 439/502, 505, 506, 52, 516, 404, 407, 411, 412, 413, 422, 405, 492, 499; 174/52.1, 52.3, 70 C, 71 R, 70 R, 72 A, 72 C, 72 TR

[56] References Cited

U.S. PATENT DOCUMENTS

| | | | |
|---|---|---|---|
| D. 340,912 | 11/1993 | Miller | D13/154 |
| D. 340,913 | 11/1993 | Miller | D13/154 |
| 2,627,537 | 2/1953 | Weisberg | 173/361 |
| 3,591,834 | 7/1971 | Kolias | 317/101 |
| 3,877,774 | 4/1975 | Dorrell | 339/99 |
| 3,879,575 | 4/1975 | Dobbin et al. | 174/92 |
| 3,976,351 | 8/1976 | Hopfe | 339/99 |
| 4,068,912 | 1/1978 | Hudson, Jr. et al. | 339/99 |
| 4,080,034 | 3/1978 | Werner | 339/98 |
| 4,113,341 | 9/1978 | Hughes | 339/147 |
| 4,169,647 | 10/1979 | Knowles et al. | 339/99 |
| 4,188,083 | 2/1980 | Knowles | 339/99 |
| 4,206,962 | 6/1980 | Shue, Jr. et al. | 339/147 |
| 4,209,219 | 6/1980 | Proietto | 339/99 |
| 4,252,396 | 2/1981 | Wilson | 339/99 |
| 4,386,819 | 6/1983 | Asick et al. | 339/147 |
| 4,426,125 | 1/1984 | Crawford | 339/99 |
| 4,427,253 | 1/1984 | Smith et al. | 339/98 |
| 4,466,050 | 8/1984 | Lockard | 362/307 |
| 4,497,975 | 2/1985 | Selsing | 174/19 |
| 4,508,399 | 4/1985 | Dowling et al. | 339/17 |
| 4,575,169 | 3/1986 | Duplatre et al. | 339/44 |

(List continued on next page.)

FOREIGN PATENT DOCUMENTS

WO 95/10863 4/1995 WIPO .............................. H01R 4/24

OTHER PUBLICATIONS

Aktuator–Sensor Interface—The alternative to the wiring harness.

TRI–LEAD: A New Interconnection Scheme for Computers; J.T. Kolias, Feb. 1972.

Twin–and Tri–Lead.

IBM Technical Disclosure Bulletin—Trilead Cable; J.T. Kolias, Oct. 1969.

AMP Catalog 65689, "AMP Mini–Drop Wire Splice," (Sep. 1996); p. 96, AMP Incorporated, Harrisburg PA.

AMP Catalog 82065, "AMP Mini–Drop Wire Splice," (May 1993); pp. 1–2, AMP Incorporated, Harrisburg PA.

"AKTUATOR–SENSOR INTERFACE" The alternative to the wiring harness, pp. 002/021–021/021.

J.T. Kolias, "TRI–LEAD: A New Interconnection Scheme for Computers" pp. 80–81, 83–84, 86, 88, 90, Feb. 1972.

J.T. Kolias, Trilead Cable, p. 659, Oct. 1969.

*Primary Examiner*—Paula Bradley
*Assistant Examiner*—Ross Gushi
*Attorney, Agent, or Firm*—Patrick S. Yoder; John J. Horn; William R. Walbrun

[57] ABSTRACT

A network, network connector and method are provided for transmitting power and data signals between device nodes. The network utilizes a trunk cable in which a pair of power conductors and a pair of signal conductors are embedded in an insulative cover. The connector makes contact with the power and signal conductors during installation, such as by contact members which pierce the insulative cover of the cable. The connector has a base portion and an interface portion fitted to the base portion. A capacitor is disposed in the base portion and electrically coupled across the power conductors when the connector is installed. A node device is coupled to the cable via the interface module. When the device draws power from the cable, the capacitor limits perturbations of the supply voltage to reduce differential mode noise on the signal conductors.

17 Claims, 16 Drawing Sheets

U.S. PATENT DOCUMENTS

| | | | |
|---|---|---|---|
| 4,764,125 | 8/1988 | Debortoli | 439/403 |
| 4,767,354 | 8/1988 | Saligny | 439/413 |
| 4,902,241 | 2/1990 | Lockard | 439/395 |
| 4,935,582 | 6/1990 | Calligaris | 174/92 |
| 4,963,700 | 10/1990 | Olsen et al. | 174/138 |
| 4,992,061 | 2/1991 | Brush, Jr. et al. | 439/620 |
| 5,006,077 | 4/1991 | Loose et al. | 439/409 |
| 5,059,137 | 10/1991 | Dale et al. | 439/395 |
| 5,064,380 | 11/1991 | Dale et al. | 439/113 |
| 5,139,440 | 8/1992 | Volk et al. | 439/413 |
| 5,154,633 | 10/1992 | Lee | 439/409 |
| 5,186,648 | 2/1993 | Senra | 439/409 |
| 5,188,541 | 2/1993 | Comerci et al. | 439/596 |
| 5,192,832 | 3/1993 | Rudy, Jr. et al. | 174/52.1 |
| 5,219,303 | 6/1993 | Daly et al. | 439/422 |
| 5,302,144 | 4/1994 | Francois et al. | 439/781 |
| 5,323,454 | 6/1994 | Shay et al. | 379/327 |
| 5,397,859 | 3/1995 | Robertson et al. | 174/92 |
| 5,412,356 | 5/1995 | Marsh et al. | 333/167 |
| 5,453,022 | 9/1995 | Staiger et al. | 439/404 |
| 5,637,011 | 6/1997 | Meyerhoefer et al. | 439/409 |
| 5,704,801 | 1/1998 | Walker et al. | 439/417 |

FIG. 17
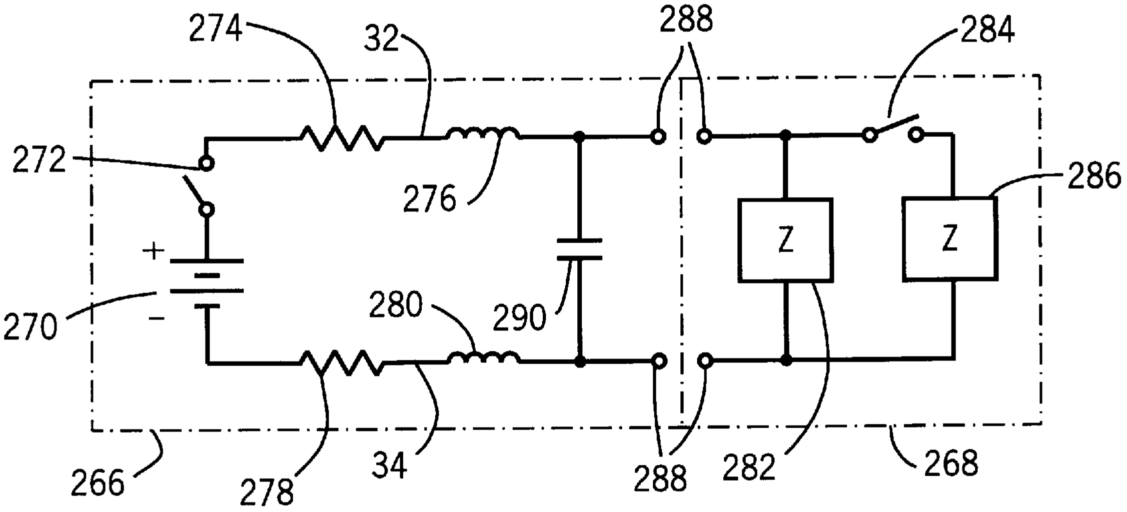
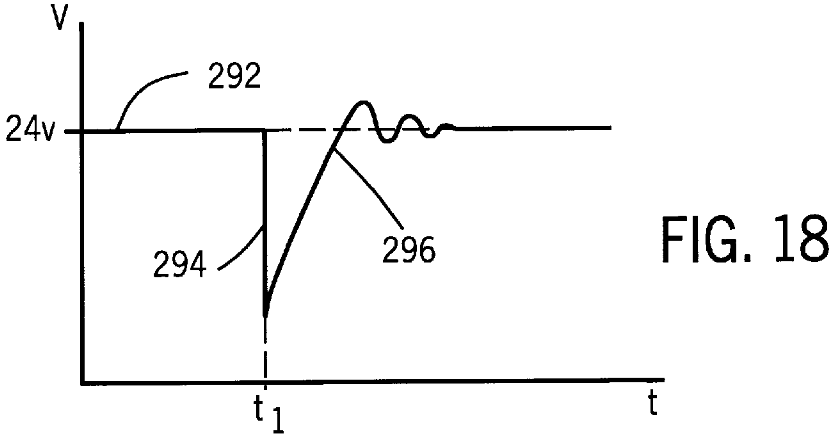
FIG. 18
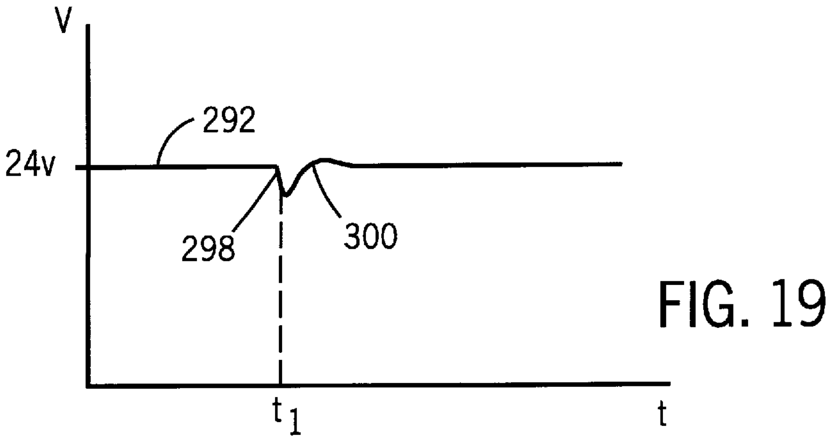
FIG. 19

METHOD AND APPARATUS FOR TRANSMITTING POWER AND DATA SIGNALS VIA A NETWORK CONNECTOR SYSTEM INCLUDING INTEGRAL POWER CAPACITORS

BACKGROUND OF THE INVENTION

1. Field Of The Invention

The present invention relates generally to powered control and monitoring systems, such as industrial control networks. More particularly, the invention relates to a modular connector system including capacitors for enhancing performance of a power and data network.

2. Description Of The Related Art

A variety of control systems are known and are presently used in industry for communicating control and feedback signals between remote controllers, sensors and actuators. In a typical application, a process, such as a manufacturing or assembly line, will include a number of sensors for providing information relating to the manufacturing process, such as speeds of conveyors, speeds of motors, temperatures, pressures, feed rates, fluid levels, logical states of switches, and so forth. The sensed information is transmitted from the sensors to one or more control units which contain logic devices for processing the signals. A number of actuators will also typically be included for executing specific control functions or controlling various phases of the manufacturing process. The actuators might include motor controllers, electric relays, solenoid coils, and so forth. In most modem applications, the control circuit will include one or more microprocessors, solid state memory devices and other related circuitry appropriately programmed in accordance with the specific application. Based upon the sensed information and upon the program being executed by the controller, the controller will generate and transmit control or command signals to the actuators for carrying out the desired process. In many applications, a large number of sensed parameters and controlled actuators may be included to implement and control many facets of a manufacturing or other process.

In control and monitoring systems of the type described above, large scale networking is generally achieved by coupling the controllers, sensors and actuators to some type of shared network media. The network media permits the devices included in the network to communicate and receive data signals in accordance with predetermined protocols. To reduce the number of signal conductors required in the network media, the protocols typically permit devices to transmit and receive signals which are digitized or pulsed and encoded to include both address information and parameter information.

The type of network media employed in any particular application may vary depending upon the types of devices coupled to the network and their needs. In particular, certain monitoring and control networks provide only data signals without electrical power to the networked devices. In other applications, both data signals and electrical power are applied to the devices. In systems of the latter type, particular problems arise in providing a straightforward and reliable media package in which both power and data signals can be transmitted without adversely influencing the quality of data signal transmission due to the presence of power conductors and external fields generating differential mode noise, which can lead to errors in the transmission and recognition of data signals.

In one known approach, a pair of power conductors and a pair of signal conductors are twisted together in a media cable. The cable serves as a trunk line for transmitting both power and data signals between networked devices. The cable includes a shielding system around the conductors for reducing the adverse influences of both internal and external noise on the pulsed signals transmitted by the signal conductors. Network media of this type is commercially available from the Allen-Bradley Company of Milwaukee, Wisconsin under the commercial designation DeviceNet.

While networks and network media of the type described above provide excellent power and data transmission capabilities, they are not without certain drawbacks. For example, a shielded trunk cable is generally attached to device node connectors by removal of the cable shields and individually connecting power and data conductors to node connectors. This installation can be somewhat time-consuming. While other approaches have been proposed to reduce the time required for installation of power and data network systems, they pose other problems owing to their structure and function. For example, in one known system, power and data signals are transmitted in a two-conductor cable, the pulsed data signals being modulated on the power signals. The cable may be connected to node points by means of insulation displacement pins. However, special circuitry is generally required at each power supply and at each node point to properly modulate, demodulate and prevent corruption of the data signals.

There is a need, therefore, for an improved technique for transmitting power and data signals between networked devices which addresses the drawbacks of existing systems. In particular, there is a need for a network system in which a multi-conductor cable can be easily and quickly installed at node connectors in a relatively short time, while assuring reliable connection between a networked device and the power and signal conductors embedded in the cable. Moreover, there is a need for a network system of this type in which the adverse effects of both internal and external noise are reduced. Where a non-shielded cable is employed in the system for facilitating installation via insulation displacement pins, there is a need for a technique which will eliminate or reduce differential mode noise imposed on the signal conductors when a network device draws power from the power conductors.

SUMMARY OF THE INVENTION

The invention provides an innovative approach to a power and data signal transmission network designed to respond to these needs. The technique focuses on the media employed for coupling networked controllers, sensors, actuators and the like to one another. The media preferably include a cable having power and signal conductors disposed in an insulative cover. The insulative cover can be pierced by insulation displacing members during installation. In a particularly preferred configuration, a modular connector is installed on the cable and serves to couple the cable to the networked device. A power capacitor is installed in the connector so as to electrically couple the capacitor across the power conductors. As current is drawn by a networked device through the connector, the capacitor serves to provide at least a portion of the power to the device, limiting changes in potential difference between the power conductors. The connector thus limits differential mode noise on the signal conductors which may be generated by changes in the potential difference between the power conductors.

Thus, in accordance with the first aspect of the invention, a modular connector is provided for a power and data transmission network. The network includes a trunk cable having first and second power conductors, and first and second signal conductors disposed in an insulative cover. The power and signal conductors are configured to transmit power and data to a plurality of device nodes. The connector comprises a modular body, a device interface, a plurality of conductive elements, and a capacitive circuit. The device interface is configured to transmit power and data from the power and data conductors to a networked device. First and second conductive elements are disposed in the body for conducting power from the power conductors to the device interface. Third and fourth conductive elements are disposed in the body for conducting data signals from the signal conductors to the device interface. The capacitive circuit is disposed in the body and is electrically coupled to the first and second conductive elements.

In accordance with another aspect of the invention, a network is provided for transmitting electrical power and data to a plurality of device nodes. The network includes a trunk cable and at least one connector. The trunk cable has first and second power conductors, and first and second signal conductors disposed in an insulative cover. The connector is configured to be coupled to the cable. The connector includes electrically conductive power and data transmitting elements for transmitting power and data signals from the cable to a networked device coupled to a node. The connector also includes a capacitor coupled to the power transmitting elements to electrically couple the capacitor across the first and second power conductors when the connector is coupled to the cable. In a particularly preferred arrangement, insulation displacement members pierce the insulative cover of the trunk cable to establish connection between the conductive elements of the connector and the conductors embedded in the cable.

In accordance with a further aspect of the invention, a connector system is provided for a power and data transmission network. The network includes a trunk cable having first and second power conductors, and first and second signal conductors disposed in an insulative cover. The power and signal conductors are configured to transmit electrical power and data signals to a plurality of device nodes. The system includes a base module, a capacitor, and an interface module. The base module has a recess for receiving the cable and electrically conductive elements for transmitting power and data signals from the power and signal conductors. The capacitor is disposed in the base module and electrically coupled across a pair of the conductive elements which transmit power from the power conductors. The interface module is removably securable to the base module for transmitting power and data signals from the conductive elements to a device node.

In accordance with a further aspect of the invention, a method is provided for transmitting power and data signals to a networked device. The method includes a first step of coupling the device to a trunk cable via a modular connector. The cable includes first and second power conductors, and first and second signal conductors disposed in an insulative cover. The power conductors are coupled to a source of electrical power. The connector includes a capacitor electrically coupled across the power conductors. An electrical potential difference is then applied to the power conductors to charge the capacitor. When an electrical current is drawn by the networked device from the power conductors through the connector the capacitor is at least partially discharged to limit a change in potential difference between the power conductors.

BRIEF DESCRIPTION OF THE DRAWINGS

The foregoing and other features and advantages of the invention will become apparent upon reading the following detailed description and upon reference to the drawings in which:

FIG. 17 is a diagrammatical view of an equivalent electrical circuit established by components of the modular connector and the network cable in accordance with a particularly preferred embodiment of the system;

FIG. 18 is a graphical representation of typical effects of current draw by a networked device as seen by power conductors of a network cable; and FIG. 19 is a graphical representation illustrating the reduced drop in potential difference between the power conductors due to the use of connector capacitors as in a preferred embodiment of the network system.

DETAILED DESCRIPTION OF SPECIFIC EMBODIMENTS

Figure 1A:
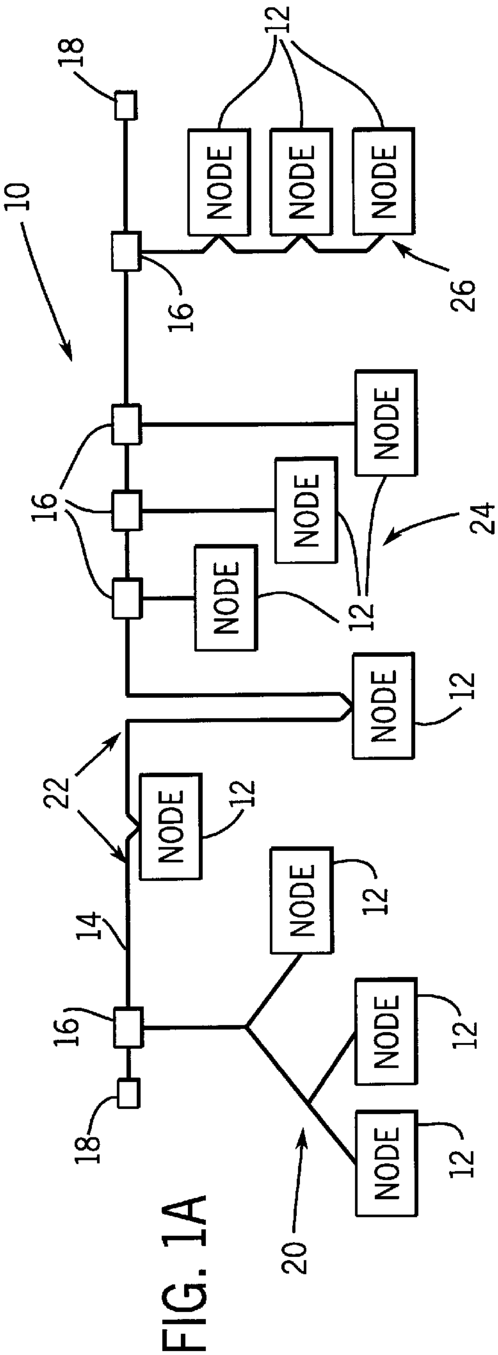
FIG. 1A is a diagrammatical illustration of a device network including a number of nodes coupled to a trunk cable via a series of modular connectors.

Turning now to the drawings, and referring first to FIG. 1, a data and power network is illustrated diagrammatically and designated generally by the reference numeral 10. The network includes a plurality of device nodes 12 coupled to one another via a trunk cable 14. Each device node receives power and data signals from cable 14 via a modular connector 16. At ends of cable 14 terminators 18 are provided for capping the cable ends and electrically terminating the signal conductors of the cable.

Each device node 12 will typically include a networked sensor or actuator unit, as will be appreciated by those skilled in the art. Depending upon the particular application in which network 10 is installed, nodes 12 may include such devices as push-button switches, proxmity sensors, flow sensors, speed sensors, actuating solenoids, electrical relays, and so forth. The nodes 12 may be coupled to the network cable 14 in a variety of topologies, including "branch drop" structures 20, "zero drop" connections 22, "short drop" connections 24, and "daisy chain" arrangements 26. In the preferred embodiment illustrated, cable 14 includes a pair of signal conductors 28 and 30 (refer to FIGS. 2 and 16) and a pair of power conductors 32 and 34, as discussed in greater detail below.

As will be appreciated by those skilled in the art each node 12 may transmit and receive data signals via cable 14 in accordance with various standard protocols. For example, cable 14 may conduct pulsed data signals in which levels of electrical pulses are identified by the nodes as data representative of node addresses and parameter information. Each node device will generally be programmed to recognize data signals transmitted over cable 14 that are required for executing a particular node function. In sensing nodes, hardware and software of generally known types will be provided for encoding sensed parameters and for transmitting digitized data signals over cable 14 representative of a node address and of a value of the sensed parameters.

Figure 1B:
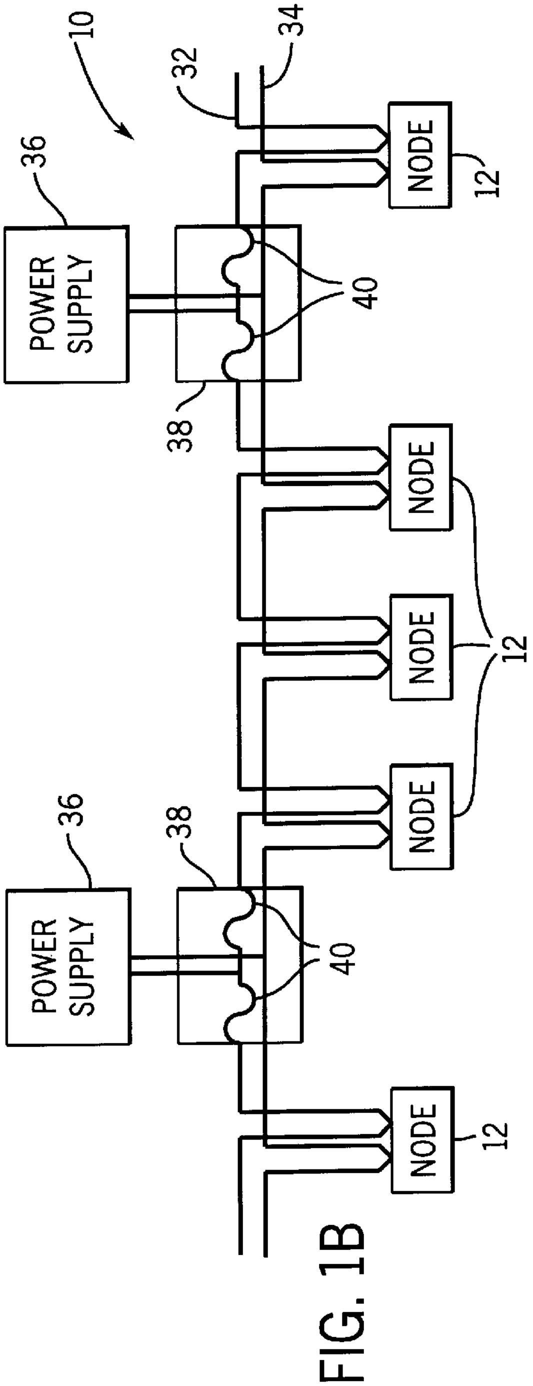
FIG. 1B is a diagrammatical illustration of a typical power distribution topology used in the network illustrated in FIG. 1A.

As represented in FIG. 1B, power conductors 32 and 34 of cable 14 permit nodes 12 to receive electrical power for their operation. In the preferred embodiment illustrated, conductors 32 and 34 form a direct current bus of predetermined voltage, such as 24 volts. Electrical power is applied to conductors 32 and 34 by power supply circuits 36 electrically coupled to conductors 32 and 34 at power taps 38. The configuration and circuitry for power supply circuits 36 are generally known in the art. Each power tap 38 may include protective devices such as fuses 40. One or both fuses may be removed from the power taps in order to isolate a portion of the network as desired.

Figure 1C:
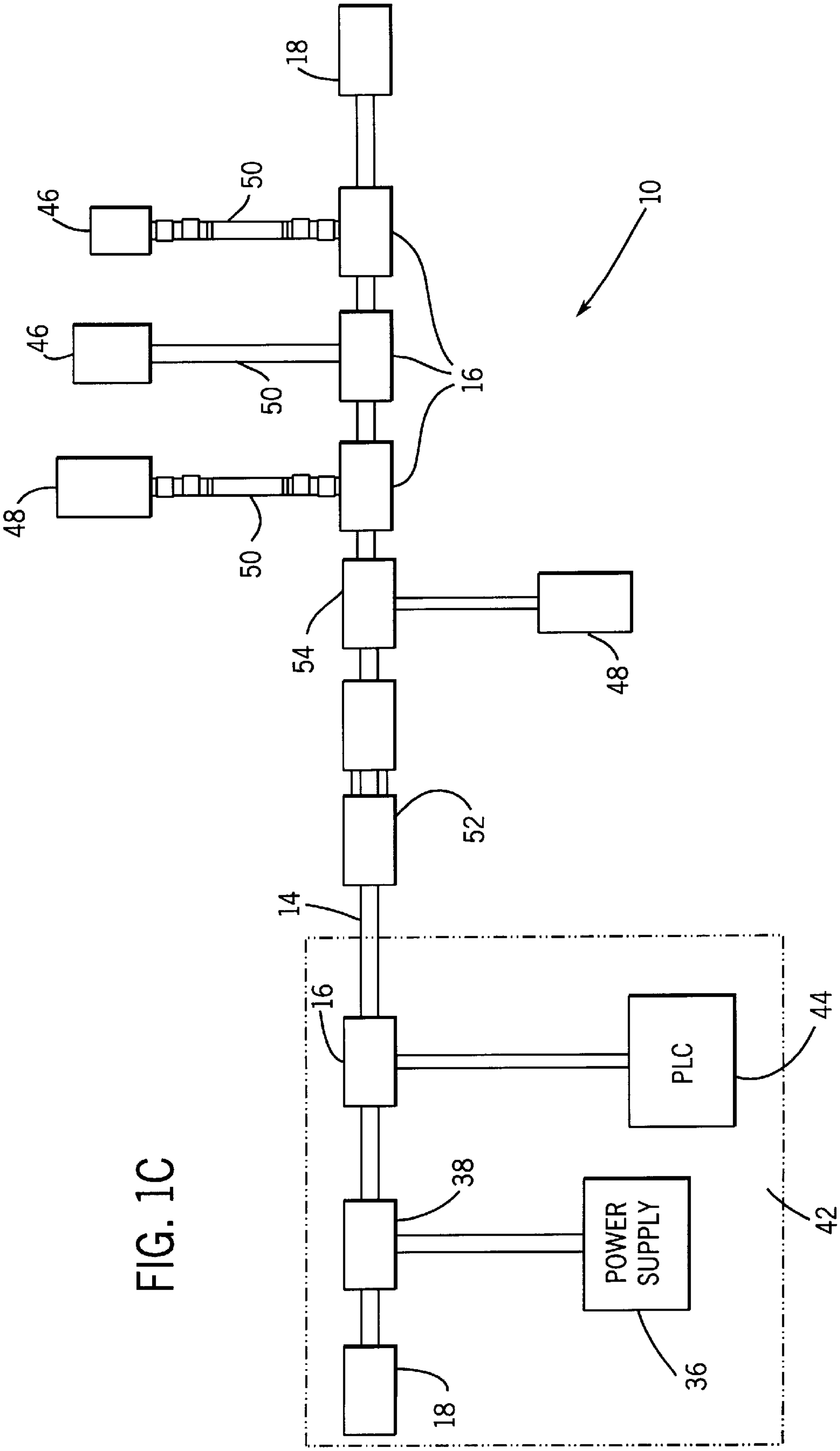
FIG. 1C is a diagrammatical illustration of physical devices positioned and coupled in the network of FIG. 1A.

FIG. 1C illustrates a typical physical level diagrammatical view of the network shown in FIGS. 1A and 1B. As illustrated in FIG. 1C, one or several of the foregoing components may be positioned in an enclosure 42. In a typical industrial application, enclosure 42 might be installed in a location in a factory readily accessible to operations and maintenance personnel, while other components of the network are positioned on manufacturing, processing, material handling and other equipment remote from the enclosure location. In the arrangement illustrated in FIG. 1C, enclosure 42 houses a terminator 18 at an end of cable 14, as well as a power tap 38 and associated power supply 36. A programmable logic controller 44 is positioned within enclosure 42 and coupled to cable 14 via a modular connector 16. Cable 14 exits enclosure 42 and is routed to a variety of sensor and actuator positions where it is coupled to actuators 46 and sensors or input devices 48 via drop or device cables 50. Moreover, cable 14 may include splice hardware 52, flat cable connection hardware 54 and so forth. At a far end of cable 14, a second terminator 18 is positioned. While any suitable electrical cable may be utilized for device cables 50, in the preferred embodiment of network 10, device cables 50 include a variety of configurations suitable for various applications, including prefabricated multi-pin drop cables, multi-lead cables which are connected to connectors 16 via terminal blocks or similar arrangements as described more fully below, and so forth.

Figure 2:
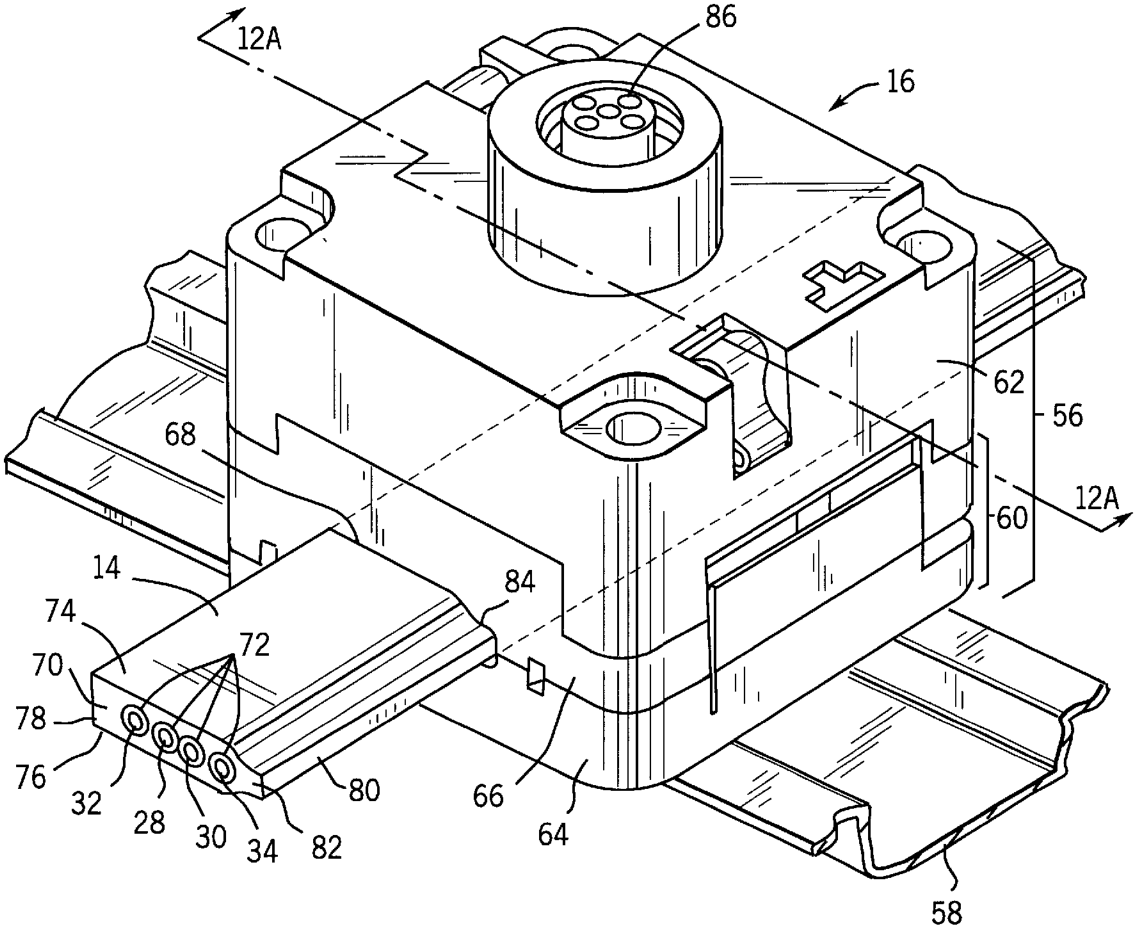
FIG. 2 is a perspective view of a modular connector secured to a network cable for use in a network of the type illustrated in FIG. 1A–1C.

As mentioned above, the preferred configuration for the power and data transmission media utilized in network 10 includes modular connectors 16 configured to draw power and transmit and receive data signals via trunk cable 14. Presently preferred embodiments of connector 16 in cable 14 are illustrated in FIG. 2. As shown in FIG. 2, connector 16 includes a modular body 56 which can be supported on a conventional mounting support, such as a DIN rail 58. Body 56 includes a base module 60 on which an interface module 62 is secured. Base module 60, in turn, is formed of a lower portion 64 and an upper portion 66 secured thereto. Lower portion 64 and upper portion 66 of base module 60 are configured to mate with one another and to form a recess or aperture 68 through which cable 14 is received. Electrical connections for transmitting power and data from cable 14 are made within base module 60 as described more fully below.

Cable 14 includes signal conductors 28 and 30 and power conductors 32 and 34 disposed generally parallel to one another in a common plane. The preferred structure of cable 14 and the advantages flowing from the preferred structure will be discussed more fully below, particularly with reference to FIG. 16. Cable 14 includes an insulative cover or jacket 70 encapsulating the signal and power conductors, as well as separate insulative covers or jackets 72 formed around each conductor. Outer insulative cover 70 has a generally flat shape defined by upper and lower side panels 74 and 76, respectively, joined by a pair of edges 78 and 80. Side panels 74 and 76 converge toward one another in a region adjacent to edge 80 to form a reduced thickness physical key 82. Recess or aperture 68 formed between upper and lower portions 64 and 66 of base module 60 includes a region 84 of reduced dimensions which corresponds to the placement of key 82, thereby ensuring that each network connector 16 is properly and uniformly positioned with respect to the conductors carried within cable 14 during installation. In the particular embodiment illustrated in FIG. 2, interface module 62 includes a multi-pin threaded interface 86 for receiving a conventional multi-pin device cable (not shown). Other interfaces are envisaged for module 62 as described below with respect to FIG. 13.

Figure 3:
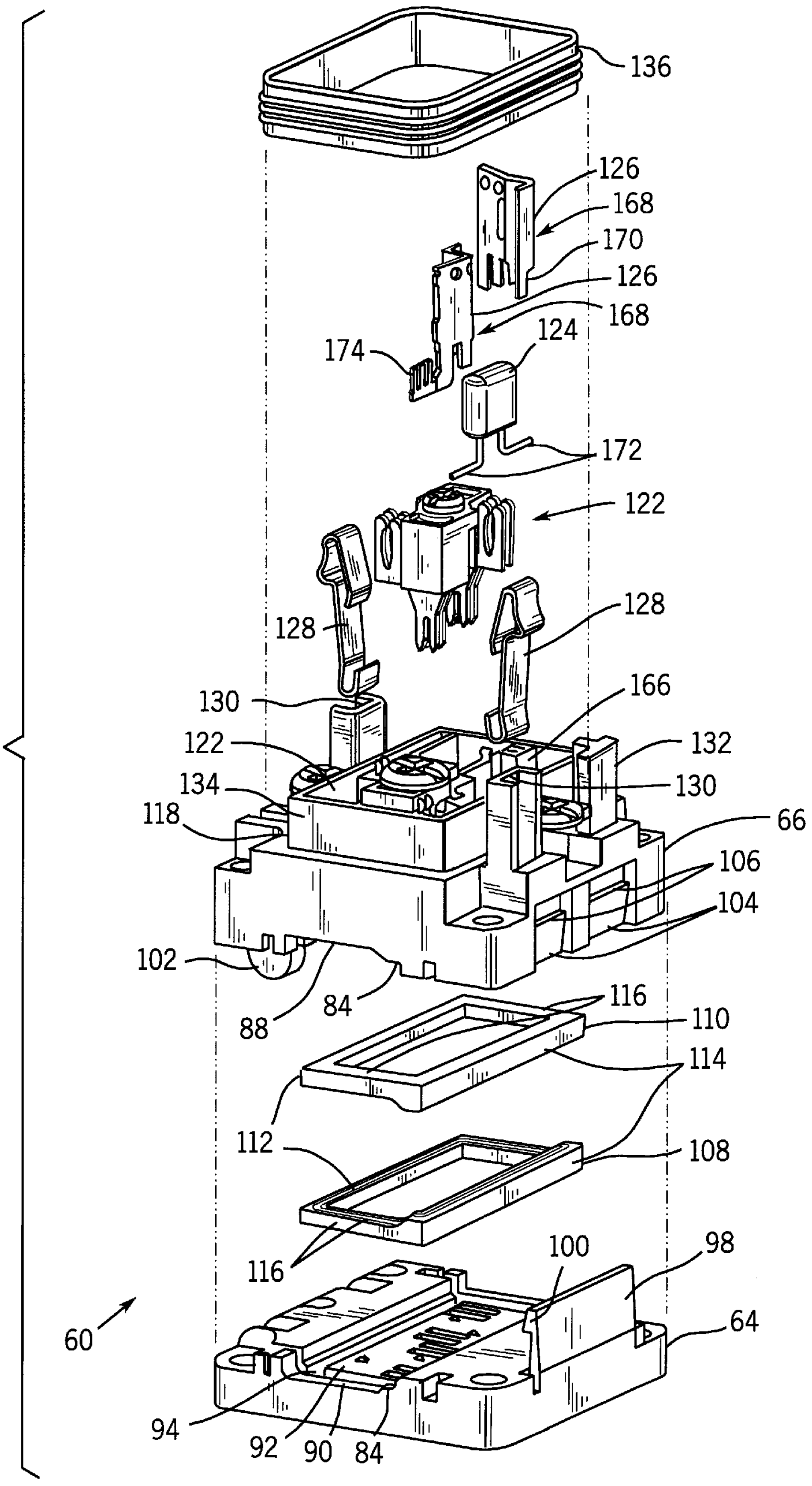
FIG. 3 is an exploded perspective view of a lower or base module of the connector illustrated in FIG. 2 illustrating its component parts.

FIGS. 3–7 illustrate a presently preferred configuration for base module 60 and component parts of the base module. As best illustrated in FIG. 3, lower portion 64 of the base module forms a lower recess 90, while upper portion 66 forms an upper recess 88, together forming the recess or aperture 68 for receiving cable 14. Within module 60, recessed surfaces of the module portions form cable interfaces 92 which generally follow the outer contour of insulating cover 70 of cable 14. Seal grooves 94 are provided in lower portion 64 and upper portion 66 around a periphery of cable interfaces 92. Lower portion 64 further includes a pair of hinge pins 96 (see FIGS. 4 and 7) for pivotably fixing upper portion 66 to lower portion 64. Opposite from hinge pins 96, lower portion 64 includes a latch plate 98 extending upwardly toward upper portion 66. Latch plate 98 forms at its upper end a latch extension 100 having an inclined upper surface and a lower latching ledge for contacting and retaining corresponding surfaces of upper module 66.

Figure 5:
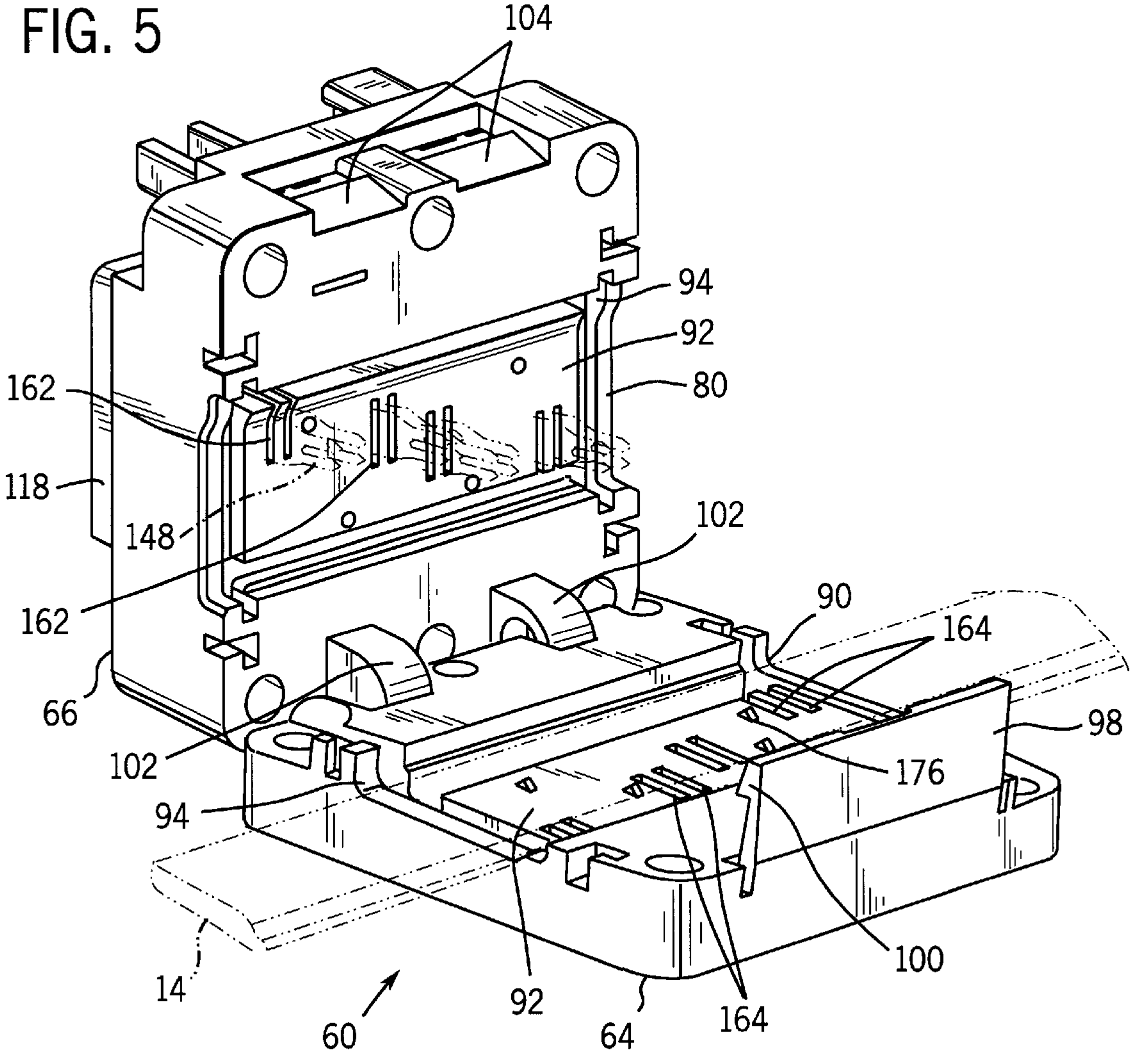
FIG. 5 is a perspective view of the base module illustrated in FIG. 2 pivoted open to receive a network cable.
Figure 7:
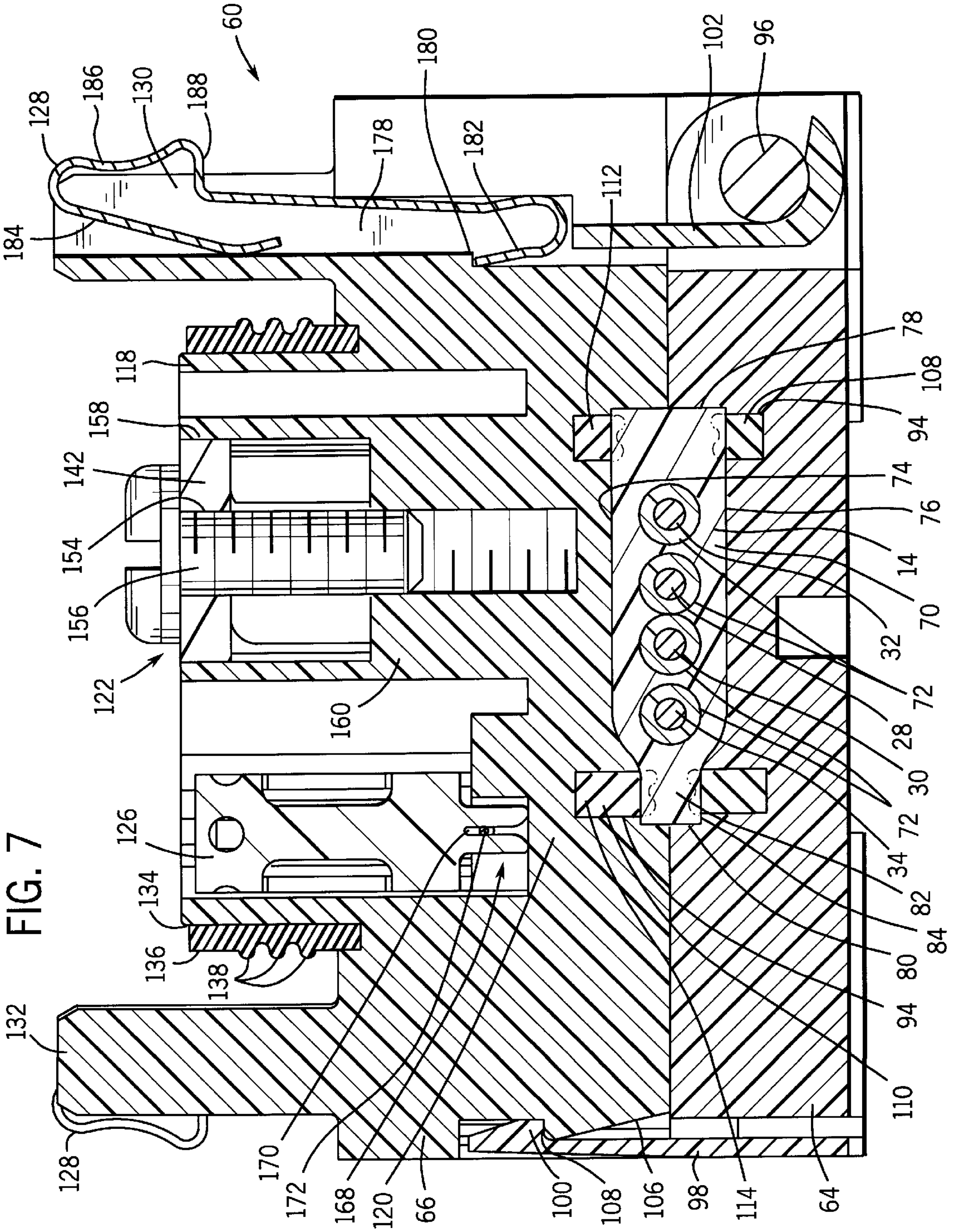
FIG. 7 is a sectional view through the base module along line 7—7 of FIG. 4, illustrating the components of the module and the preferred manner for making electrical connection with conductors in the network cable.

Upper module 66 includes a pair of open, curved hinge extensions 102 disposed to partially encircle hinge pins 96 of lower portion 64 to pivotably attach the portions of the base module together (see FIGS. 5 and 7). Opposite hinge extensions 102, a pair of inclined latch contacting surfaces 104 are positioned to contact latch plate 98 during closure of base module 60. Latch contacting surfaces 104 terminate in latching surfaces 106 which securely hold the upper portion 66 closed on lower portion 64 as described more fully below (see FIGS. 3 and 7).

To permit base module 60 to sealingly isolate regions of side panels 74 and 76 of cable 14, seals are disposed in lower portion 64 and upper portion 66. A lower seal 108 is positioned within seal groove 94 of lower portion 64. A similar upper seal 110 is positioned in seal groove 94 of upper portion 66. Seals 108 and 110 extend around the entire periphery of cable interface 92 of both upper and lower portions 64 and 66, and are formed to match the contour of cable 14. Thus, seals 108 and 110 include a reduced thickness portion 112 designed to contact side panels 74 and 76 adjacent to edge 78, as well as a greater thickness portion 114 designed to extend over a length of side panels 74 and 76 adjacent to edge 80. Lateral edge seal portions 116 extend between portions 112 and 114 and have a contour which conforms to cable 14.

Upper portion 66 of base module 60 forms a housing extension 118 protruding upwardly as illustrated in FIGS. 3–7. A lower partition 120 separates recess 90 from internal volumes within housing extension 118. A pair of carrier assemblies 122 are positioned within housing extension 118 for establishing electrically conductive paths between conductors within cable 14 and interface module 62 as described more fully below. A capacitor 124 is also housed within housing extension 118, and is electrically coupled through the carrier assemblies to power conductors in cable 14. Capacitor 124 is retained within housing extension 118 and electrically coupled to the carrier assemblies via a pair of electrically conductive retainers 126. It should be noted that various forms of capacitor 124 may be utilized in connector 16, such as surface mount-type capacitors also housed within housing extension 118. As will be appreciated by those skilled in the art, in such cases retainers 126 and the internal configuration of housing extension 118 will be adapted to accommodate the particular form of the capacitor to provide adequate support and electrical connection of the capacitor across the power conductors of cable 14 as described more fully below.

Figure 4:
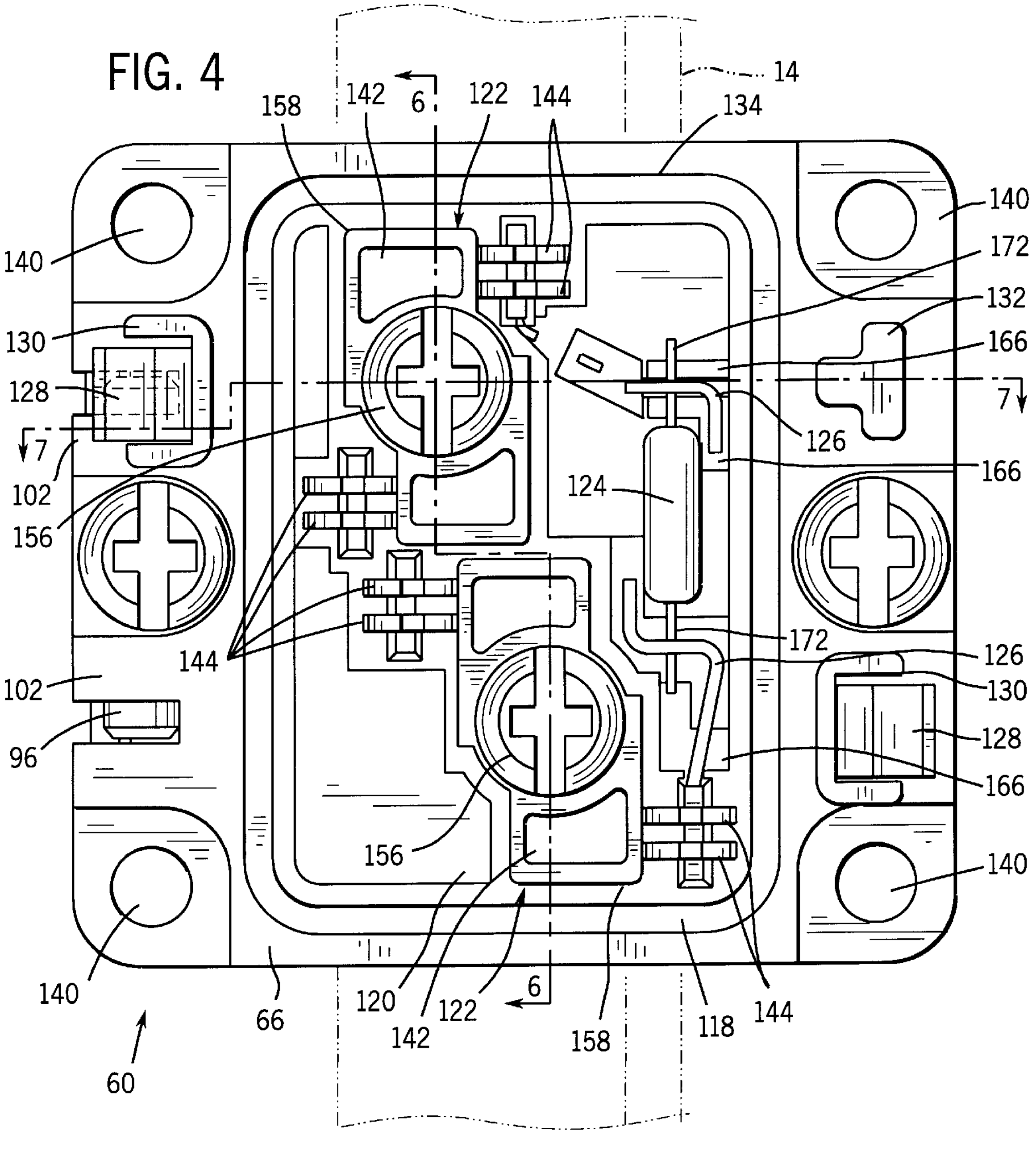
FIG. 4 is a top plan view of the base module illustrated in FIG. 3 following assembly of the component parts.
Figure 6:
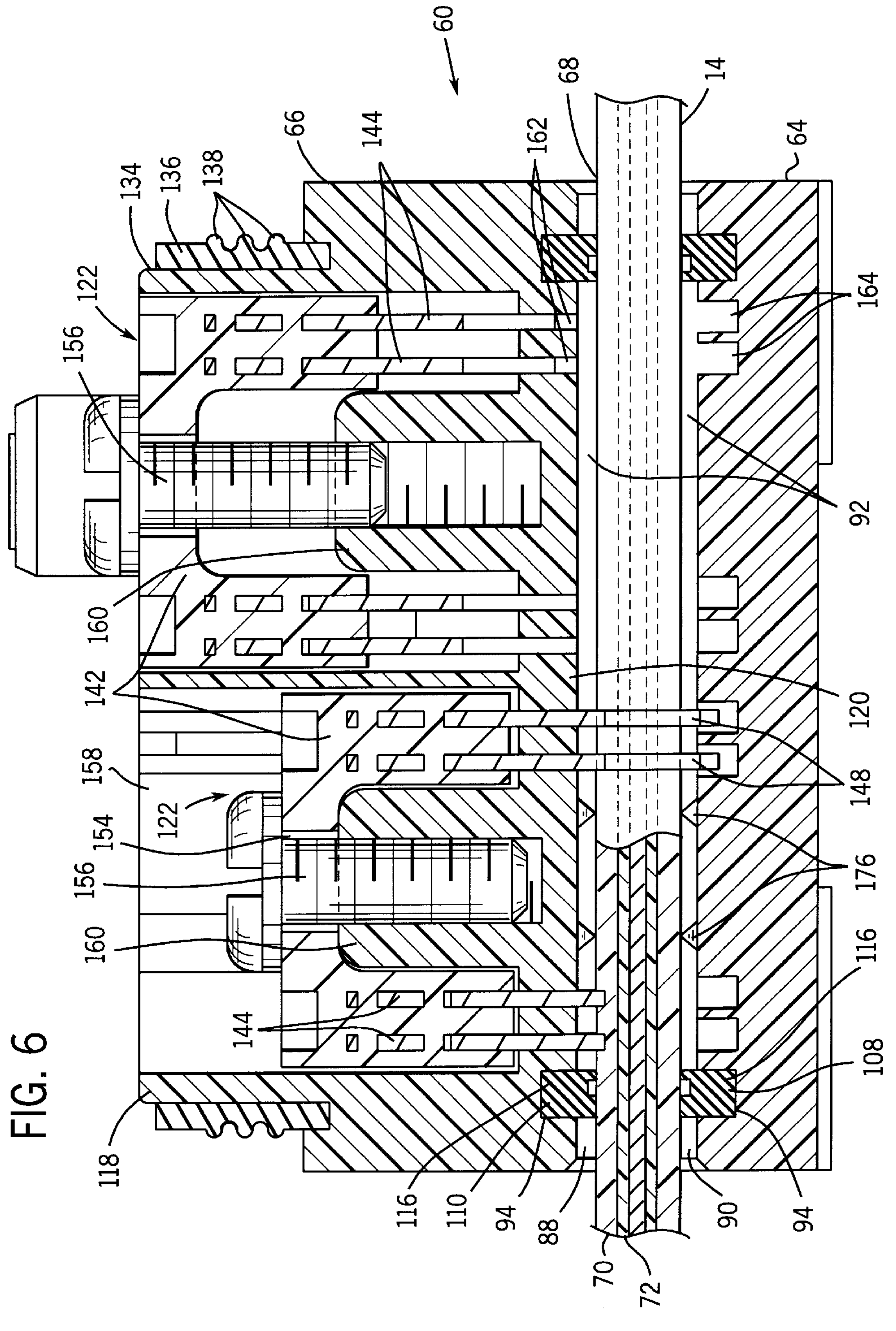
FIG. 6 is a sectional view through the base module along line 6—6 of FIG. 4, illustrating the manner in which electrical connection is made in the network cable in accordance with a particularly preferred embodiment of the module.

Upper portion 66 of base module 60 also includes a pair of retaining clips 128 for releaseably securing an interface module 62 to base module 60. Retaining clips 128 are positioned within upstanding clip channels 130 formed integrally with upper portion 66. A T-shaped alignment pin 132 extends upwardly from upper portion 66 to ensure proper positioning of interface module 62 on base module 60 as described more fully below. Between clip channels 130 and alignment pin 132, housing extension 118 is bounded by a peripheral side wall 134. A resilient peripheral interface seal 136 is secured about peripheral wall 134 to contact and seal housing extension 118 within interface module 62 when connector 16 is assembled. As best illustrated in FIGS. 3 and 4, peripheral wall 134 and interface seal 136 are preferably bilaterally symmetrical such that peripheral seal 136 may be installed about peripheral wall 134 without regard to its orientation. Moreover, as best illustrated in FIGS. 6 and 7, interface seal 136 is also preferably symmetrical about a horizontal plane such that it may be installed about peripheral wall 134 without regard to the orientation of upper and lower edges of seal 136 with respect to peripheral wall 134. A plurality of ribs 138 are preferably formed about an outer periphery of interface seal 136 to enhance a fluid tight seal with interface module 62 as described below. Both upper and lower portions 64 and 66 of base module 60 include apertures 140 formed adjacent to comers thereof to receive fasteners for securing the portions of base module 60 to one another and to a support surface (not shown).

Figure 8:
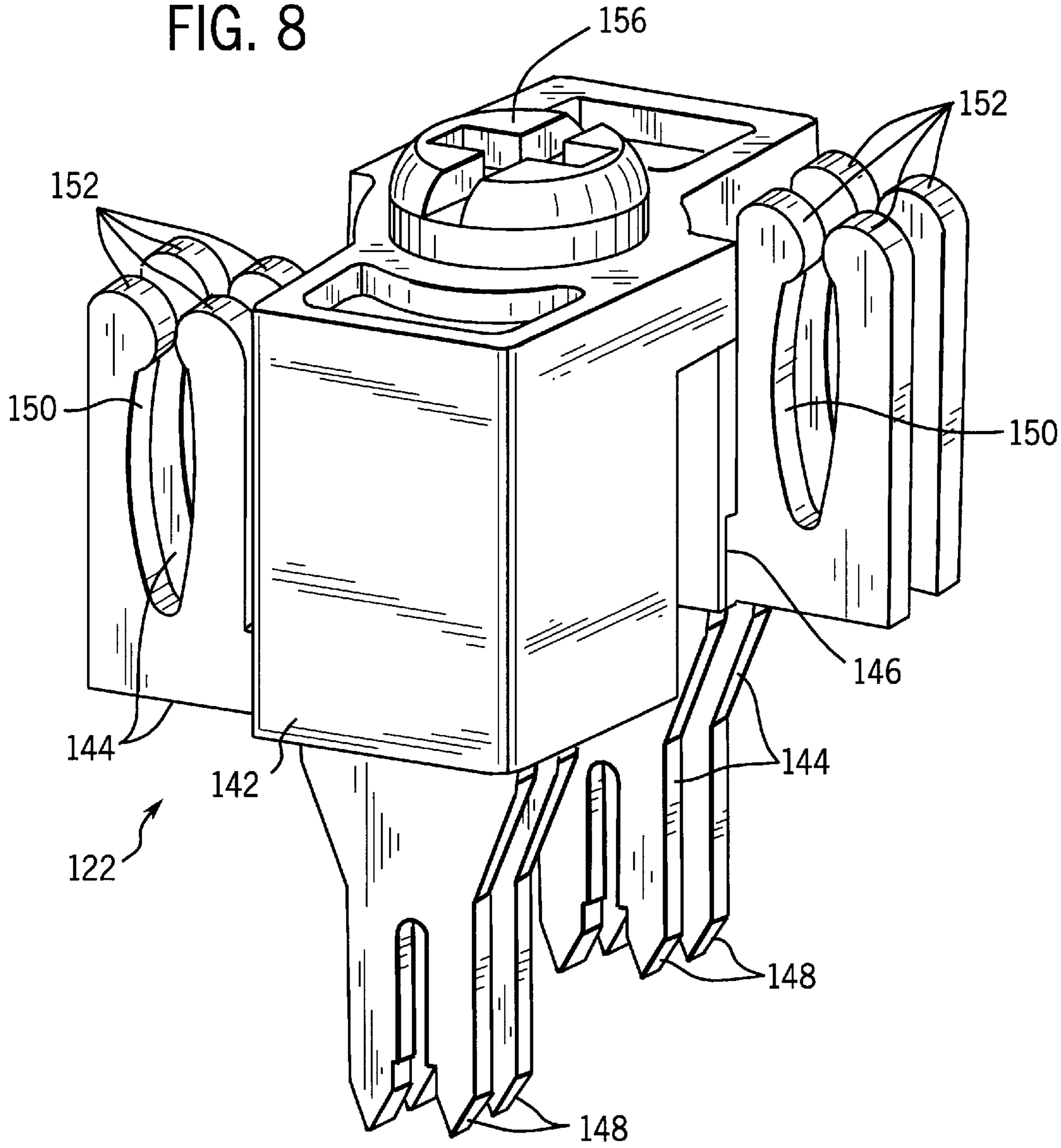
FIG. 8 is a perspective detailed view of a carrier assembly including insulation displacement members which are forced into the insulative cover of the network cable for making contact with conductors embedded in the cable.

FIG. 8 illustrates a presently preferred embodiment of carrier assemblies 122. Each carrier assembly 122 includes a non-conductive carrier body 142 supporting a plurality of conductive elements 144. In the illustrated embodiment, conductive elements 144 are provided in pairs for each conductor of cable 14. Conductive elements 144 are lodged and retained within slots 146 formed in carrier body 142. Each conductive element 144 includes a pair of insulation displacement pins 148 at a lower end thereof, and a blade receptacle 150 at an upper end thereof. Blade receptacles 150 terminate in a pair of rounded contact tips 152 for contacting and transmitting power or data signals from pins 148 to elements of interface module 62 as described more fully below. Carrier body 142 also forms a fastener slot 154 (see FIGS. 6 and 7) in which a fastener 156, such as a machine screw, is positioned. Non-conductive body electrically isolates conductive elements 144 from one another and from fastener 156.

Carrier assemblies 122 are fitted within carrier cavities 158 formed in upper portion 66 of base module 60 as best illustrated in FIGS. 4, 6 and 7. Within each carrier cavity 158, upper portion 66 presents a threaded support 160 in which a fastener 156 of the corresponding carrier assembly 122 is threadingly engaged. A series of pin slots 162 are formed in partition 120 of upper portion 66 at appropriate locations to permit insulation displacement pins 148 to extend therethrough. Pins 148 thereby extend from partition 120 through cable interface 92 of upper portion 66, as shown in FIG. 5. A series of pin slots 164 are also formed in interface 92 of lower portion 64 to permit pins 148 to protrude through cable 14 during and following installation of connector 16 on cable 14 as described more fully below.

In addition to carrier assemblies 122, upper portion 66 of base module 60 preferably includes structures for supporting and for electrically coupling capacitor 124 to conductive elements designed for electrical coupling to power conductors 32 and 34. Thus, as best shown in FIGS. 3 and 4, slotted support walls 166 are provided integrally within housing extension 118 for contacting and supporting capacitor 124. Capacitor 124 is held within walls 66 by retainers 126 which serve to maintain capacitor 124 in place within housing extension 118 as well as to complete electrical current carrying paths between conductive elements 144 and capacitor 124. Specifically, each retainer 126 includes a contact portion 168 through which slots 170 are formed for capturing leads 172 extending from capacitor 124. As best illustrated in FIGS. 4 and 7, once installed in slotted support walls 166, retainers 126 capture and make contact with leads 172 to retain capacitor 124 in place. Referring to FIG. 3, retainers 126 also include a series of slots 174 which contact the conductive elements 144 positioned to contact power conductors 32 and 34 during installation of base module 60 on cable 14. Thus, as shown in FIG. 4, following installation of carrier assemblies 122, capacitor 124, and retainers 126 within housing extension 118, leads 172 of capacitor 124 are electrically coupled to conductive elements 144 for each power conductor (i.e., the uppermost and lowermost sets of conductive elements 144 as illustrated in FIG. 4).

Base module 60 is installed and electrically coupled to cable 14 as follows. Prior to installation on cable 14, base module 60 may be supported on a DIN rail or another support structure as shown in FIG. 2. Upper portion 66 may then be pivoted with respect to lower portion 64 as shown in FIG. 5 to open the recess or aperture 68 extending through base module 60. Cable 14 is then positioned in lower recess 90 of lower portion 64 as illustrated in FIG. 5, with reduced thickness key 82 being positioned within the corresponding reduced dimension portion 84 of lower portion 64. Upper portion 66 is then closed about cable 14 by pivoting hinge extensions 102 on hinge pins 96 until latching surface 106 comes into contact with a lower portion of latch extension 100 to secure upper portion 66 closed on lower portion 64 as shown in FIG. 7. Lower and upper portions 64 and 66 may then be secured to one another by inserting fasteners (not shown) through some or all of comer apertures 140. Cable interfaces 92 preferably include several locating or retaining barbs 176 as shown in FIG. 6 for compressing outer insulation cover 70 of cable 14 slightly and thereby to retain cable 14 securely in place during installation. Moreover, it will be noted that as upper portion 66 is closed over lower portion 64, lower and upper seals 108 and 110 are compressed about side panels 76 and 74, respectively, to seal a portion of the side panels through which insulation displacement pins 148 will penetrate cable 14.

Insulation displacement pins 148 are driven into cable 14 to contact signal conductors 28 and 30 and power conductors 32 and 34 as shown in FIG. 6. Fastener 156 of each carrier assembly 122 is first threaded into its corresponding threaded support 160 to properly position the carrier assembly over cable 14. In this position, insulation displacement pins 148 extend partially through upper pin slots 162 of upper portion 66 (see carrier assembly 122 as shown in the right hand position in FIG. 6). Fastener 156 of each carrier assembly 122 is then threaded into its threaded support 160 to drive insulation displacement pins 148 downwardly through insulating cover 70 of cable 14, as well as through conductor covers 72 of corresponding signal and power conductors (see carrier assembly 122 in the left hand position in FIG. 6), thereby electrically coupling the conductive elements to the cable conductors. Tips of each insulation displacement pin 148 may protrude through cable 14 and into lower pin slots 164 of lower portion 64.

In the illustrated embodiment, each carrier assembly 122 retains and forces engagement of a set of conductive elements for two cable conductors, including one power conductor and one signal conductor. Alternative configurations could, of course, be envisioned in which a single carrier supports and forces engagement of contact elements for more than two conductors. Moreover, each carrier assembly may alternatively be configured to engage conductive elements about a pair of signal conductors or a pair of power conductors. It should be noted, however, that in the preferred embodiment illustrated, installation of conductive elements 144 on all four conductors of cable 14 is accomplished through driving only two fasteners into position within base modules 60, thereby providing a straightforward and rapid mechanism for electrically coupling connectors 16 to cable 14.

As mentioned above, base module 60 includes a pair of retaining clips 128 for releaseably securing interface module 62 in place on base module 60. As best illustrated in FIG. 7, each retaining clip 128 is preferably formed of a resilient metallic stamping which is inserted into and retained within clip channels 130. Each clip channel 130 includes a channel recess 178 for receiving a retaining clip. Within recess 178, a lower retaining surface 180 is formed for abutting a lower hook-shaped retainer portion 182 formed on each retaining clip 128. On an end of each clip opposite from portion 182, a spring head 184 is formed which bears against a back portion of the clip channel 130. A front incline 186 is provided on each spring head for contacting a portion of the interface module during installation and for forcing elastic deformation of spring head 184. Incline 186 is bounded at a lower region by a clip surface 188 designed to contact and retain an interface module 62 as described more fully below.

Figure 9:
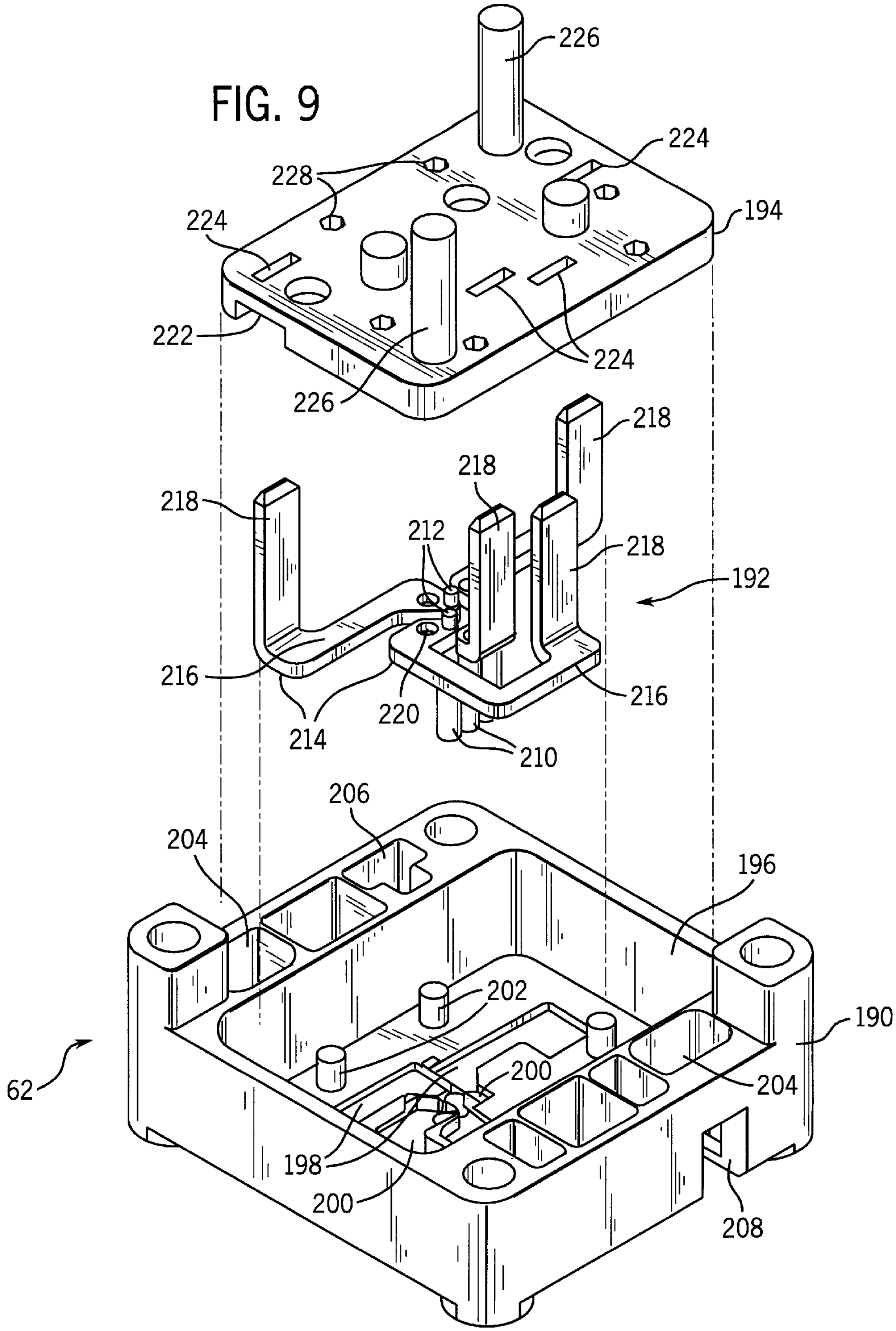
FIG. 9 is an exploded perspective view of components of the upper portion or interface module of the connector illustrated in FIG. 2, showing a preferred manner for transmitting power and data signals through the interface module.
Figure 10:
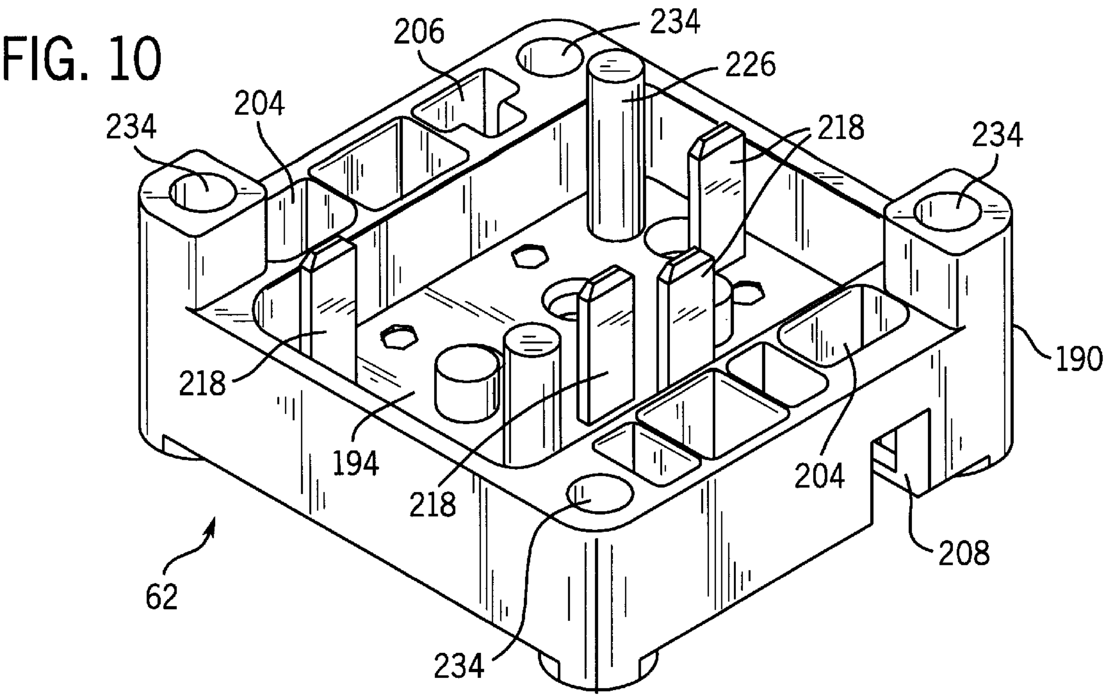
FIG. 10 is a perspective view of the interface module shown in FIG. 9 after assembly.
Figure 11:
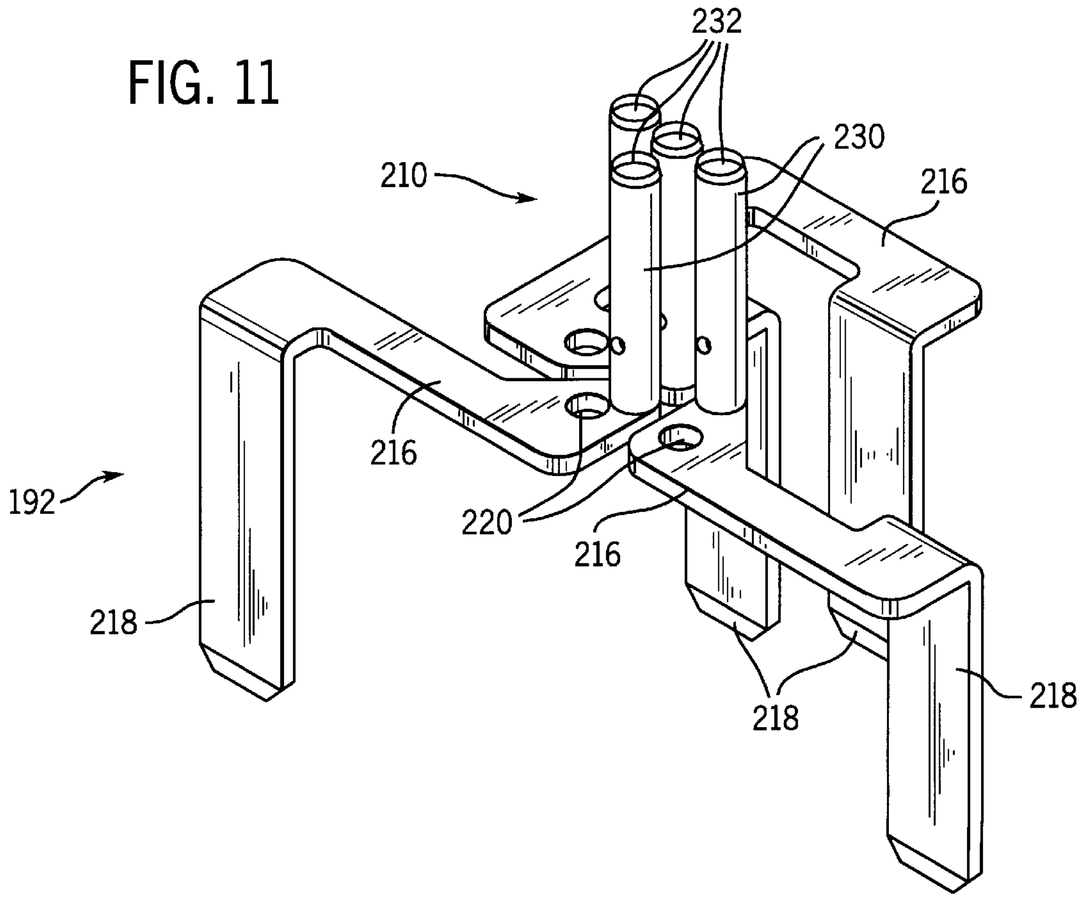
FIG. 11 is a detail perspective view of conductive members for the interface module shown in FIGS. 9 and 10.

FIGS. 9–11 represent a presently preferred embodiment of interface module 62. As shown in FIG. 9, interface module 62 includes a cap 190 (illustrated inverted from the position shown in FIG. 2), a conductor assembly 192 and a retaining plate 194. Cap 190 has an internal cavity 196 configured to receive conductor assembly 192 and retaining plate 194, and to fit about housing extension 118 of upper portion 66 of base module 60. A series of conductor receiving cavities 198 are formed in a base of cavity 196 for positioning of conductor assembly 192 Moreover, a series of apertures 200 are formed in cap 190 extending from conductor cavities 198 through cap 190 as described more fully below with reference to FIGS. 12A and 12B. Alignment pins 202 extend within cavity 196 for appropriately locating retaining plate 194 therein. Cap 190 also includes a pair of clip channel apertures 204 positioned to permit passage of clip channels 130 and clips 128 therethrough. An alignment pin aperture 206 is formed to conform to and receive T-shaped alignment pin 132 of base module 60. Also as shown in FIG. 9, cap 190 presents a clip opening 208 for receiving and cooperating with clip 128 (see FIG. 7) to retain interface module 62 in place on base module 60.

As shown in FIGS. 9 and 11, conductor assembly 192 includes a group of contact extensions 210 coupled via integrally formed pins 212 to respective conductors 214. The illustrated embodiment is particularly suited for receiving a multi-pin connector of a type generally known in the art. Thus, contact extensions 210, pins 212 and conductors 214 are electrically conductive and serve to route power and data signals through interface module 62 between a networked device and base module 60. Each conductor 214 includes a routing portion 216 providing spacing between contact extensions 210 and locations of conductive elements 144 of base module 160. Each routing portion terminates in a contact blade 218 configured to mate with blade receptacles 150 of conductive elements 144 within base module 60.

In the illustrated embodiment, conductors 214 may receive contact extensions 210 for two types of interfaces. In particular, at ends of routing portions 216 opposite blades 218, each conductor 214 includes a pair of pin apertures 220 for receiving pins 212 of contact extensions 210 in two different locations. As shown in FIGS. 9 and 11, pins 212 of contact extensions 210 are positioned in apertures 220 corresponding to locations of pins in a conventional "micro"

style multi-pin connector. Alternatively, the same pins may be positioned in the second apertures 220 of each conductor for use of the same components in an interface module 62 configured to receive another connector style, such as a conventional "mini" multi-pin connector.

Referring again to FIG. 9, retaining plate 194 is formed to fit within cavity 196 of cap 190 and to hold conductor assembly 192 in place therebetween. Thus, plate 194 has a series of conductor cavities 222 in a bottom face thereof, similar to cavities 198 of cap 190. Blade slots 224 are formed through plate 194 to permit passage of blades 218 therethrough. A series of alignment pins 226 extend from plate 194 to ensure proper alignment of interface module 62 on base module 60 during installation. Finally, a series of alignment apertures 228 are formed through plate 194 to receive alignment pins 202 of cap 190.

Interface module is assembled as follows. Contact extensions 210 are first placed in apertures 200 of cap 190 and conductors 214 are located within cavities 198, thereby inserting pins 212 in appropriate apertures 220. Retaining plate 194 is then placed over conductors 214, with blades 218 extending through slots 224 as shown in FIG. 10. Routing portions 216 of the conductors are thus fitted between cavities 198 of cap 190 and cavities 222 of plate 194. Plate 194 preferably enters into snapping engagement within cap 190 to facilitate assembly of module 62. Alternatively, fasteners (not shown) may be provided for fixing plate 194 securely within cap 190.

Figure 12A:
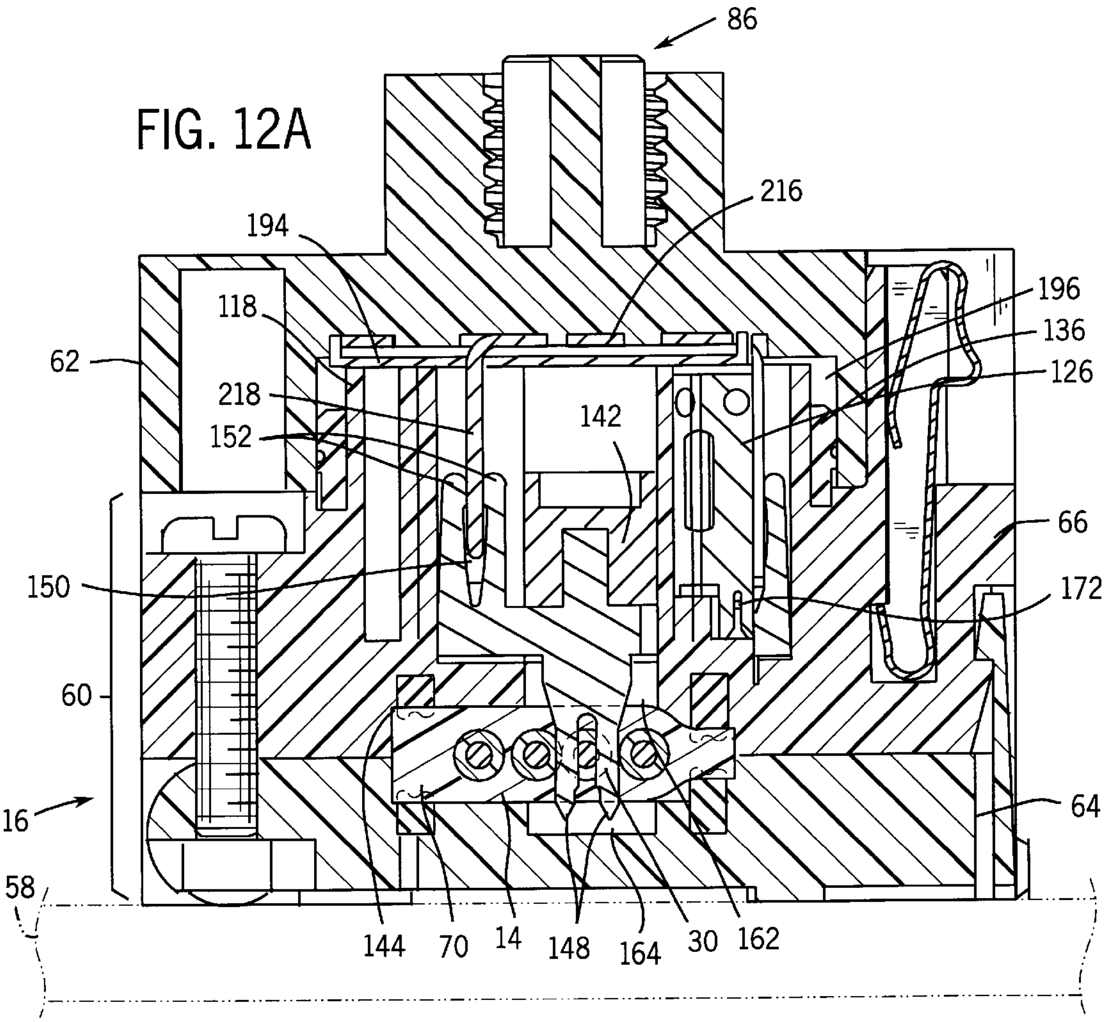
FIG. 12A is a sectional view through the assembled connector of FIG. 2 along line 12A—12A of FIG. 2, illustrating the preferred manner in which power and data signals are transmitted from the network cable to the device interface module through the intermediary of the base module.
Figure 12B:
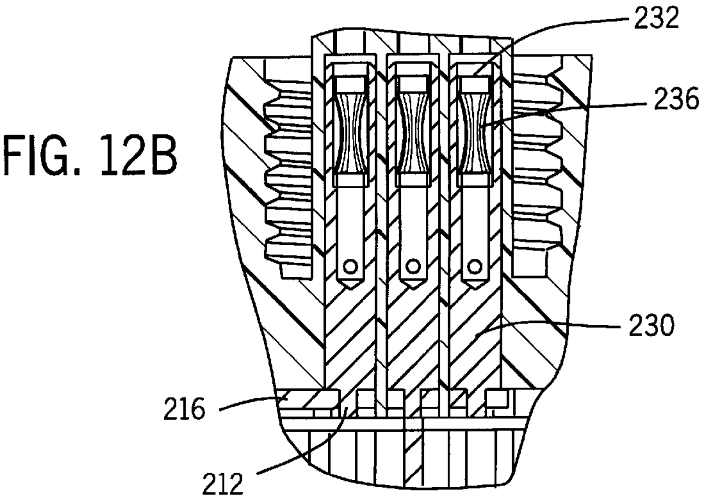
FIG. 12B is a detail sectional view of a portion of the assembled connector illustrated in FIG. 12A showing a portion of the module adapted for receiving terminal or connecting pins of a device cable.

With base module 60 coupled to cable 14 as described above, interface module 62 may be fitted onto base module 60 to complete connect or 16 as illustrated in FIGS. 12A and 12B. As shown in FIG. 12A, interface module 62 is fitted securely on base module 60 such that cavity 196 of cap 190 is sealed about housing extension 118 by virtue of peripheral seal 136. Blades 218 of interface module 62 enter into and are electrically coupled to blade receptacles 150 of each set of conductive elements 144. Four separate conductive e paths are thus defined between conductors of cable 14 a nd interface module 62. One such conductive path is illustrated in FIG. 12A, for signal conductor 30.

As described above, conductor assembly 192 includes contact extensions 210 configured for coupling to a device cable connector end or the like. FIG. 12B illustrates three such extensions for a micro-type connector. For such connectors, pins 212 from the extensions complete current carrying paths between routing portions 216 of conductors 214 and a series of contact extensions 210, each having a tubular body 230. Open ends 232 of each body 230 are configured to receive pins (not shown) of a device cable connector. Where such pins are of a reduced dimensions with respect to the openings provided in bodies 230, reducing inserts 236 are provided in each body to ensure adequate electrical contact between the contact extensions and the pins.

It should be noted that, as mentioned above, the foregoing structure of modular connector 16 and cable 14 provides an effective networking media system that is both simple to install and may be used with a variety of networked devices. Moreover, the preferred configuration of base module 60 allows the connector to be installed on cable 14 in a minimal number of steps, and thereafter remain resident on cable 14. By providing different types of interface modules 62 adapted to fit on a universal base module 60, the system may accommodate sensors, actuators, power supplies and controllers networked via a wide range of device cables or other drop lines.

Figure 13:
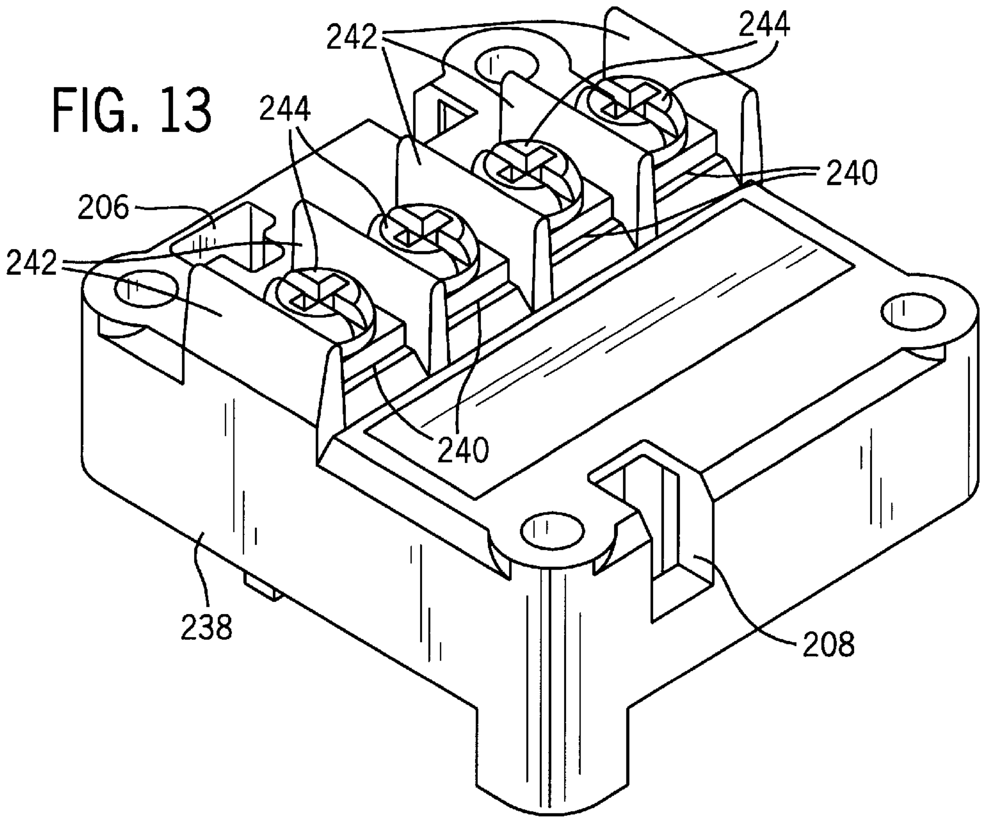
FIG. 13 is a top perspective view of an alternative configuration for an interface module designed to receive leads from a device or device cable.

By way of example, FIG. 13 shows an alternative interface module in the form of an open or terminal interface 238 designed for connection to leads (not shown) of a device cable. Terminal interface 238 is similar in overall design to the multi-pin interface described above with respect to FIGS. 9–11, including a cap for sealingly fitting over base module 60 and for completing connections to blade receptacles 150. However, in terminal interface 238, conductor assembly 192 (see FIG. 9) is adapted to convey power and data signals through screw terminals 240. Terminals 240 are separated by partitions 242 and each include fasteners 244 for fixing a cable lead thereto.

Figure 14:
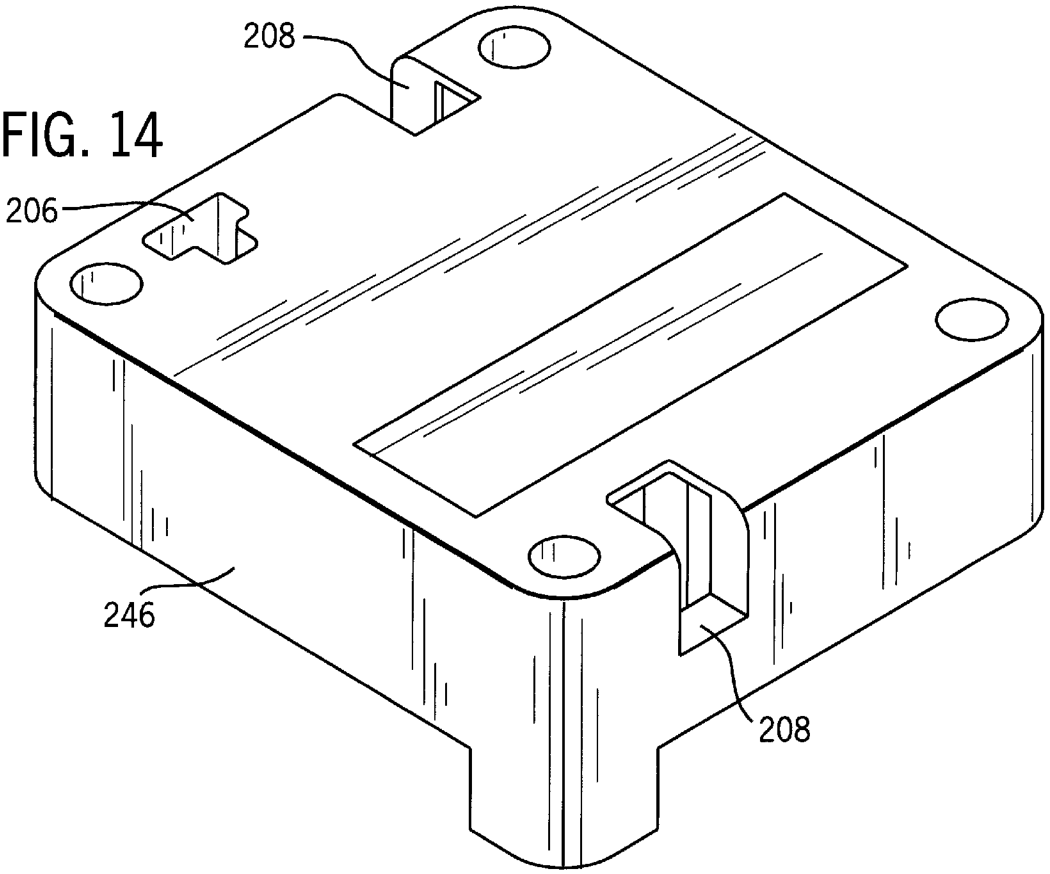
FIG. 14 is a top perspective view of a blank cap for use in place of an interface module on the base module of the connector when the connector is either taken out of service or is utilized as a terminator in the network.

As mentioned above, base module 60 may be capped by a blank cover when a device is removed from the network, or when base module 60 is used at an end of cable 14 as a terminator (see terminators 18 in FIG. 1A). FIG. 14 illustrates a modular blank cover 246 for such applications. Where a device is removed from the network, cover 246 includes only a retaining plate of the type described above with respect to FIG. 9, with no conductor assembly. Alternatively, where the connector is to serve as a terminator, blank cover 246 is preferably configured as illustrated in FIG. 15.

Figure 15:
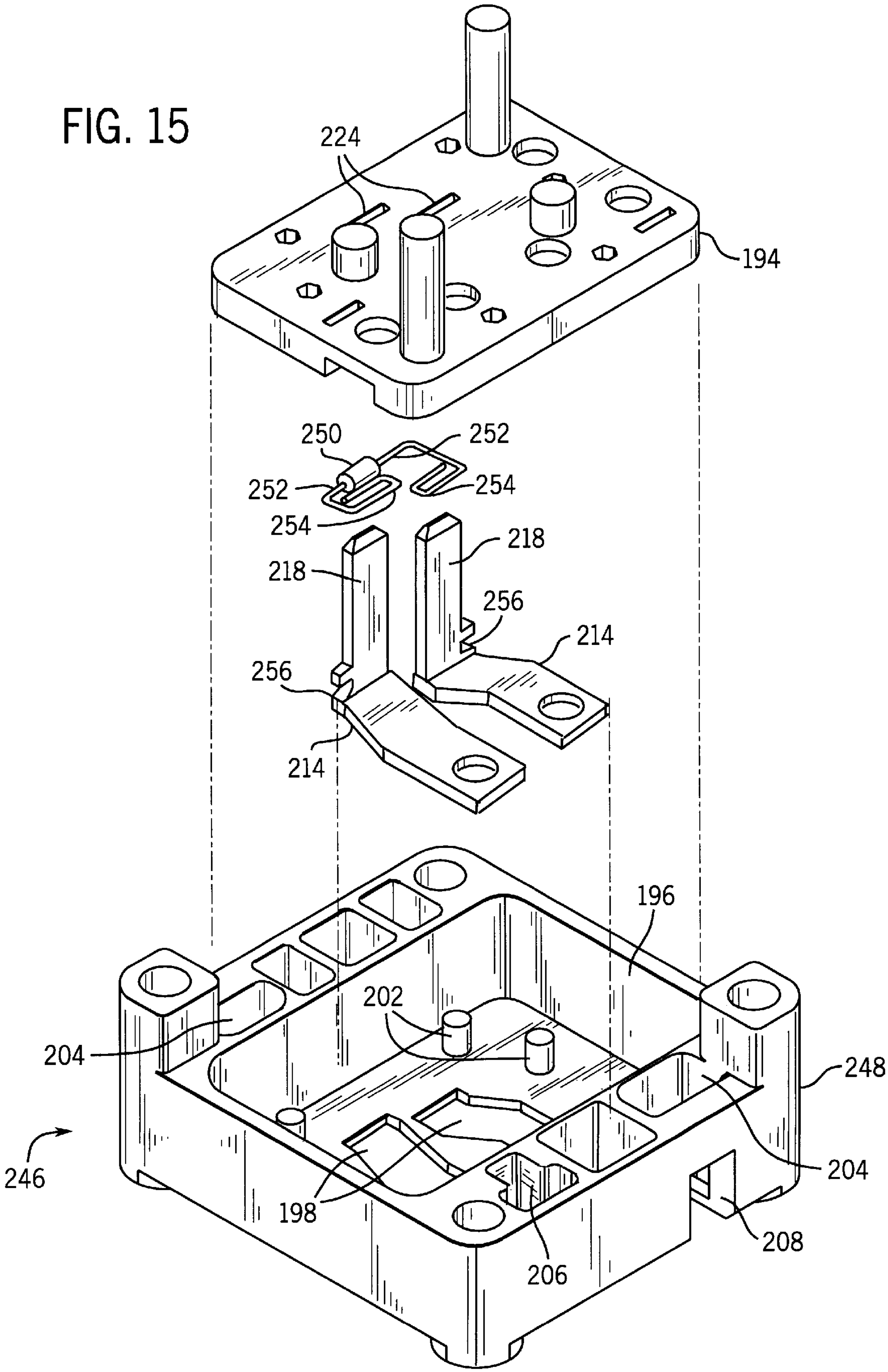
FIG. 15 is an exploded perspective view of the blank cap illustrated in FIG. 14, showing the components of the cap for use in a terminator in the network.

As shown in FIG. 15, cover 246 includes a blank cap 248 in which a resistor 250 is installed and electrically coupled to conductors 214 for the signal conductors of cable 14. Leads 252 of resistor 250 are bent to form loops 254, and conductors 214 are formed with retaining recesses 256 in which loops 254 fit to physically and electrically couple the resistor across the conductors. Each conductor is disposed within cavities 198 within cap 248 and a retaining plate 194, which may be substantially similar to the plate described above with respect to FIG. 9, is fitted over the conductors and resistor to complete the assembly. In the presently preferred embodiment, resistor 250 is a 121 ohm terminating resistor.

Figure 16:
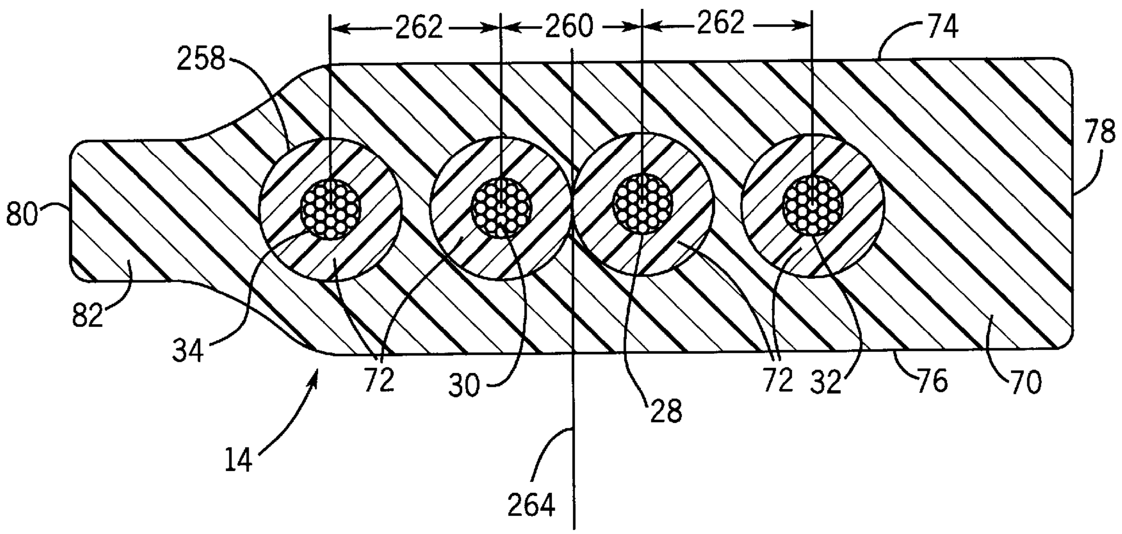
FIG. 16 is a sectional view of the trunk cable used in the network illustrating a preferred configuration of the power and signal conductors in insulative jackets of the cable.

As mentioned above, the preferred embodiment of cable 14 affords rapid installation to connectors 16 via insulation displacement members, and offers enhanced immunity to both internal and external noise. FIG. 16 illustrates the presently preferred structure of cable 14. As shown in FIG. 16, cable 14 includes a pair of signal conductors 28 and 30 positioned parallel to and in a common plane with a pair of power conductors 32 and 34. Each conductor is disposed in an individual insulative cover 72, which may be color coded for easy recognition of the nature of the enclosed conductor. A second unitary insulative cover 70 surrounds covers 72. Cover 70 is formed to permit side panels 74 and 76 thereof to be sealed during installation as described above. A resist layer 258 is preferably provided between covers 72 and cover 70 to allow removal of a portion of cover 70 while leaving some or all of conductors 28–34 insulated by their individual cover 72.

Within cable 14, conductors 28–34 are disposed to minimize differential mode noise on signal conductors 28 and 30, and to provide partial shielding of the signal conductors. In particular, signal conductors 28 and 30 are disposed as close to one another as feasible, spaced by a distance designated 260 in FIG. 16, to approximately equalize the influence of external noise sources on signal carried by the conductors. Signal conductors are disposed between power conductors 32 and 34, and spaced from respective conductors by a distance 262, slightly greater than distance 260. Moreover, the signal and power conductors are disposed generally symmetrically about a vertical axis 264 to further equalize the influence of capacitive coupling. Similarly, the plane along which the conductors are disposed defines a plane of symmetry both for the conductors and for cover 70, including key 82. Thus cable 14 may be installed within connector 16 with either face 74 or 76 facing toward interface module 62. In a presently preferred embodiment, conductors 28–34 are 16 AWG conductors made of tin plated copper. Insulative covers 70 and 72 are made of Stantoprene 453 TPE, and are separated by a resist layer 258 of talc to prevent bonding of the covers. Spacing 260 between signal conductors is 0.110 inches, and spacing 262 between each power conductor and a respective signal conductor is 0.130 inches.

The preferred configurations of cable 14 and of connector 16 as described above also minimize differential mode noise which can result from power draws by networked devices. In particular, by providing a capacitive source of power within each connector, changes in potential difference between conductors 32 and 34 are minimized, thereby reducing disturbances on signal conductors 28 and 30. FIG. 17 is a diagrammatical representation of an equivalent electrical circuit established by the network, designated 266, and a networked device 268 to illustrate this point. Within network 266, power supplies 36 (see FIG. 1B) establish the equivalent of a constant voltage source 270. When a node is coupled to the network, voltage is applied to terminal points 288 by effectively completing a circuit as shown by switch 272. Thereafter, power conductors 32 and 34 operate with resistive and inductive components 274–280, both consuming and storing electrical energy.

Each networked device 268 in turn includes its own electrical properties, as indicated at 282, even with not drawing significant power from source 270. From time to time during operation of the network, however, certain devices will draw power, such as during energization of a relay or solenoid coil, effectively closing a switch 284 to establish a current carrying path through a load 286. During such periods of operation, capacitor 124, coupled across power conductors 32 and 34 within connector base 60, serves as a source of transient power for the associated node. Thus, as the network is powered up following installation of a connector 16, capacitor 124 is charged to the nominal voltage of the network power source, such as 24 volts d.c., and subsequently discharges and recharges to smooth variations in voltage across the power conductors.

FIGS. 18 and 19 illustrate graphically the influence of capacitor 124 on voltage across the power conductors of cable 14. As shown in FIG. 18, without capacitor 124, the voltage across the conductors at a node would be expected to drop rapidly from nominal voltage 292, as indicated line 294 at time t1 corresponding to initial energization of the networked device. Depending upon the level of current drawn by the device, the resistances and inductances 274–280 (i.e., the length from power sources and the cable electrical characteristics), and the capabilities of the networked power sources, the voltage across the power conductors would be expected to recover as indicated by line 296. Because during this transient period current will flow through power conductors 32 and 34 in opposite directions, differential mode noise caused by coupling of the power conductors with the signal conductors could lead to bit errors in data signals carried by the signal conductors.

FIG. 19 illustrates the manner in which changes in potential difference between the power conductors is attenuated by capacitor 124. As shown in FIG. 19, although some voltage drop 298 occurs during initial energization of the node device at t1, the magnitude of the drop is greatly reduced, as is the time required for recovery of the voltage to its nominal level, as shown by line 300.

It should be noted that in very active networks having a large number of node devices coupled to shared power conductors variations in voltage between the power conductors may occur very frequently, producing dynamic responses quite different from those illustrated in FIGS. 18 and 19. However, it has been found that even in the presence of such frequent changes in device power draws, the presence of a capacitor 124 within each node connector is effective at reducing differential mode noise imposed on the signal conductors of cable 14. In particular, it has been found that the use of a capacitor in each connector permits the use of a longer trunk cable and installation of nodes at greater distances from the power supplies along the trunk cable. Moreover, it should be noted that by providing capacitor 124 in each base module 60, perturbations resulting from coupling and uncoupling devices via interface modules 62 are reduced, particularly when such devices are brought on line or taken off line during operation of the network.

While the foregoing preferred embodiments have been described and illustrated by way of example, the present invention is not intended to be limited in any way to any particular embodiment or form of execution. Rather, the invention is intended to extend to the full scope of the appended claims as permitted by this specification and the prior art.

What is claimed is:

1. A modular connector for a power and data transmission network, the network including a trunk cable having first and second power conductors and first and second signal conductors disposed in an insulative cover, the power and signal conductors being configured to transmit power and data to a plurality of device nodes, the connector comprising:

a modular body;

a device interface configured to transmit power and data from the power and data conductors to a networked device;

first and second conductive elements disposed in the body for conducting power from the power conductors to the device interface;

third and fourth conductive elements disposed in the body for conducting data signals from the signal conductors to the device interface; and a capacitive circuit disposed in the, body and electrically coupled to the first and second conductive elements wherein the capacitive circuit is operative to limit chances in potential difference between the power conductors due to power drawn by a device coupled to the connector.

2. The connector of claim 1, further comprising a plurality contact members electrically coupled to the first, second, third and fourth conductive elements, the contact members having contact portions configured to pierce the insulative cover of the cable and to contact the power and signal conductors.

3. The connector of claim 1, wherein the body includes a base module and an interface module, the base module being configured to remain resident on the cable, the interface module being configured to be removably secured to the base module.

4. The connector of claim 3, wherein the first, second, third and fourth conductive elements and the capacitive circuit are disposed in the base module.

5. A network for transmitting electrical power and data to a plurality of device nodes, the network comprising:

a trunk cable having first and second power conductors and first and second signal conductors disposed in an insulative cover; and at least one connector configured to be coupled to the cable, the connector including electrically conductive power and data transmitting elements for transmitting power and data signals from the cable to a networked device coupled to a node, the connector further comprising a capacitor coupled to the power transmitting elements to electrically couple the capacitor across the first and second power conductors when the connector is coupled to the cable wherein the capacitor is operative to limit changes in potential difference between the power conductors due to power drawn by a device coupled to the connector.

6. The network of claim 5, wherein the signal conductors are disposed intermediate the power conductors in the insulative cover.

7. The network of claim 5, wherein the connector includes a plurality of contact members electrically coupled to the conductive elements, the contact members being configured to pierce the insulative cover and to electrically couple the power and signal conductors to the conductive elements.

8. The network of claim 5, wherein the connector includes a base portion configured for attachment to the cable and an interface portion removably secured to the base portion for transmitting power and data signals from the base portion to a networked device.

9. The network of claim 8, wherein the capacitor is disposed in the base portion.

10. A connector system for a power and data transmission network, the network including a trunk cable having first and second power conductors and first and second signal conductors disposed in an insulative cover, the power and signal conductors being configured to transmit electrical power and data signals to a plurality of device nodes, the system comprising:

a base module having a recess for receiving the cable and also having electrically conductive elements for transmitting power and data signals from the power and signal conductors;

a capacitor disposed in the base module and electrically coupled across a pair of the conductive elements which transmit power from the power conductors wherein the capacitor is operative to limit changes in potential difference between the power conductors due to power drawn by a device coupled to the connector; and an interface module removably securable to the base module for transmitting power and data signals from the conductive elements to a device node.

11. The system of claim 10, wherein the base module includes a lower portion and an upper portion, the lower and upper portions mating to form a recess for receiving the cable.

12. The system of claim 10, wherein the conductive elements include contact portions configured to pierce the insulative cover and to contact the power and signal conductors upon installation of the base module on the cable.

13. A method for transmitting power and data signals to a networked device, the method comprising the steps of:

(a) coupling the device to a trunk cable via a modular connector, the cable including first and second power conductors and first and second signals conductor disposed in an insulative cover, the power conductors being coupled to a source of electrical power, the connector including a capacitor electrically coupled across the power conductors;

(b) applying an electrical potential difference to the power conductors to charge the capacitor;

(c) applying an electrical current to the device from the power conductors through the connector; and (d) at least partially discharging the capacitor to limit change in the potential difference between the power conductors.

14. The method of claim 10, wherein the connector includes a base portion and an interface portion, the capacitor being disposed in the base portion, and wherein step (a) includes electrically coupling the device to the interface portion.

15. The method of claim 10, wherein step (a) includes installing the base portion on the cable such that the interface portion is removable from the base portion without removal of the base portion from the cable.

16. The method of claim 10, wherein the base portion is installed on the cable via contact members which pierce the insulative cover and contact the power and signal conductors.

17. The method of claim 16, wherein the signal conductors are disposed in the cable intermediate the power conductors, and wherein step (d) includes limiting differential mode noise imposed on the signal conductors due to the change in potential difference between the power conductors.

* * * * *